(12) United States Patent
Nguyen

(10) Patent No.: US 10,538,965 B1
(45) Date of Patent: Jan. 21, 2020

(54) PROGRAMMABLE AND REMOVABLE AUTOMATIC MOTORIZED ROLLER SHADE WITH COLOR LED NIGHTS LIGHT AND METHOD

(71) Applicant: Vince T Nguyen, Liverpool, NY (US)

(72) Inventor: Vince T Nguyen, Liverpool, NY (US)

( * ) Notice: Subject to any disclaimer, the term of this patent is extended or adjusted under 35 U.S.C. 154(b) by 143 days.

(21) Appl. No.: 15/620,277

(22) Filed: Jun. 12, 2017

Related U.S. Application Data

(60) Provisional application No. 62/506,266, filed on May 15, 2017, provisional application No. 62/350,103, filed on Jun. 14, 2016.

(51) Int. Cl.
| | | |
|---|---|---|
| *E06B 9/70* | (2006.01) | |
| *G05B 15/02* | (2006.01) | |
| *F21V 17/06* | (2006.01) | |
| *H05B 37/02* | (2006.01) | |
| *E06B 9/68* | (2006.01) | |

(52) U.S. Cl.
CPC ............... *E06B 9/70* (2013.01); *F21V 17/06* (2013.01); *G05B 15/02* (2013.01); *H05B 37/02* (2013.01); *E06B 2009/6872* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,003,218 A | * | 12/1999 | Schumann | B23P 19/04 29/24.5 |
| 6,082,433 A | * | 7/2000 | Vafaie | E06B 9/68 160/310 |
| 6,283,190 B1 | * | 9/2001 | Hu | E06B 9/32 160/168.1 P |
| 2010/0018654 A1 | * | 1/2010 | Skinner | E06B 9/322 160/84.02 |

* cited by examiner

*Primary Examiner* — Bentsu Ro

(57) ABSTRACT

Programmable and removable automatic motorized roller shade with color LED night lights is a fully automatic programmable motorized window shade incorporates many functionalities including automatic shade open and close, automatic programmable shade position or shade length position, foldable and removable tubular tubes, rechargeable and programmable wireless remote controls, built-in matching color LED night lights and easy removable color shade fabric. The system automatically open and close depending on the programming parameters, software timers and the light level detects through the photoresistor sensor which is programmed and controlled by the micro controller. The system consisting of two or more tubular tubes joined together with at least one set of quick connecting and disconnecting couplings creating a single removable and foldable tubular tube. The number of tubular tubes and couplings needed to create a single tubular tube are depending on the physical window width the shade fabric intents to cover. The built-in internal color LED night lights, external color LED night lights and matching removable color shade fabric brings to life an exciting colorful environment in the dark of night. Rechargeable lithium batteries provide necessary continuous backup power and programmable wireless receiver provides manual and wireless remote controls programming and manually operating of the system.

8 Claims, 28 Drawing Sheets

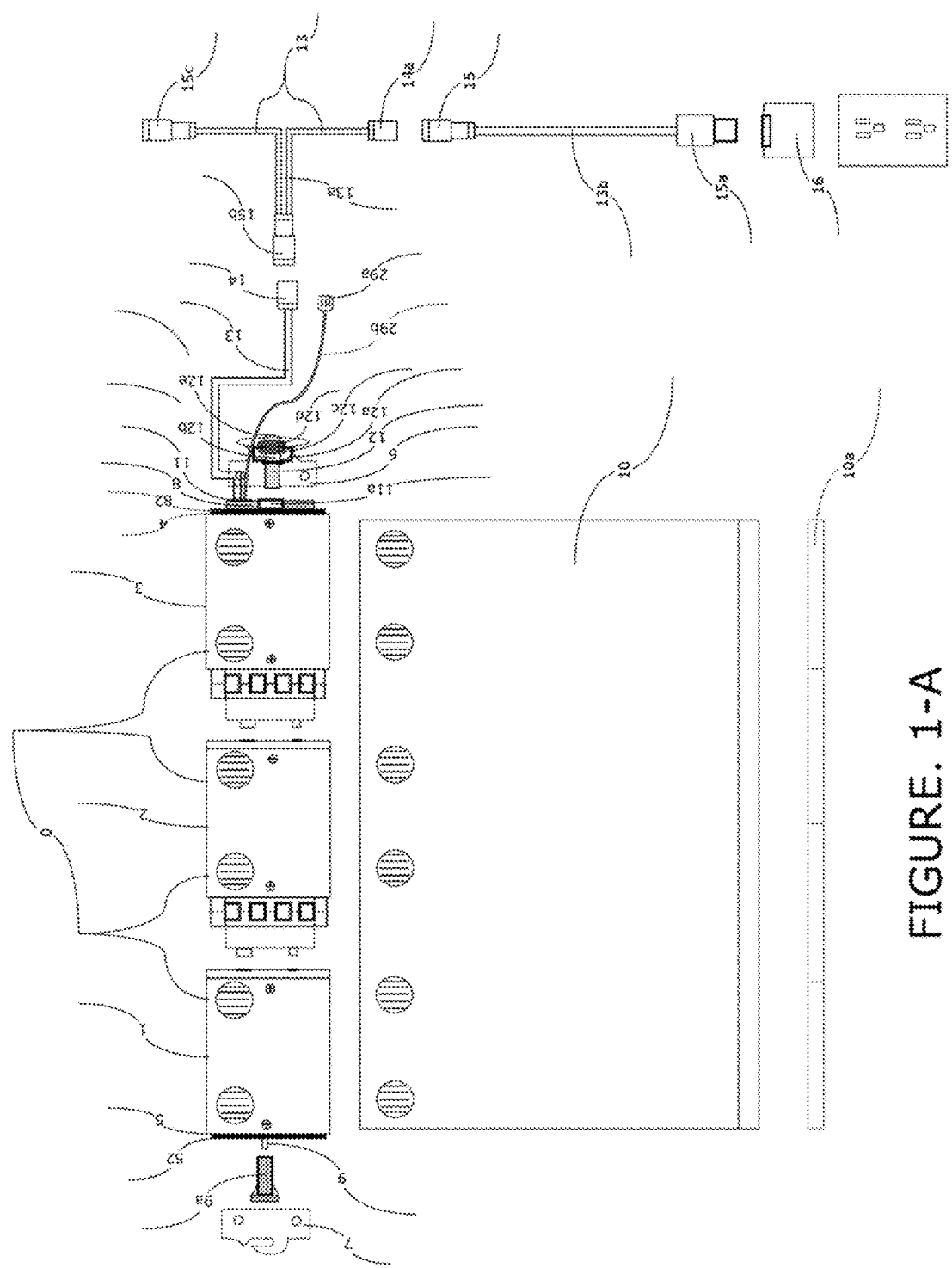
FIGURE. 1-A

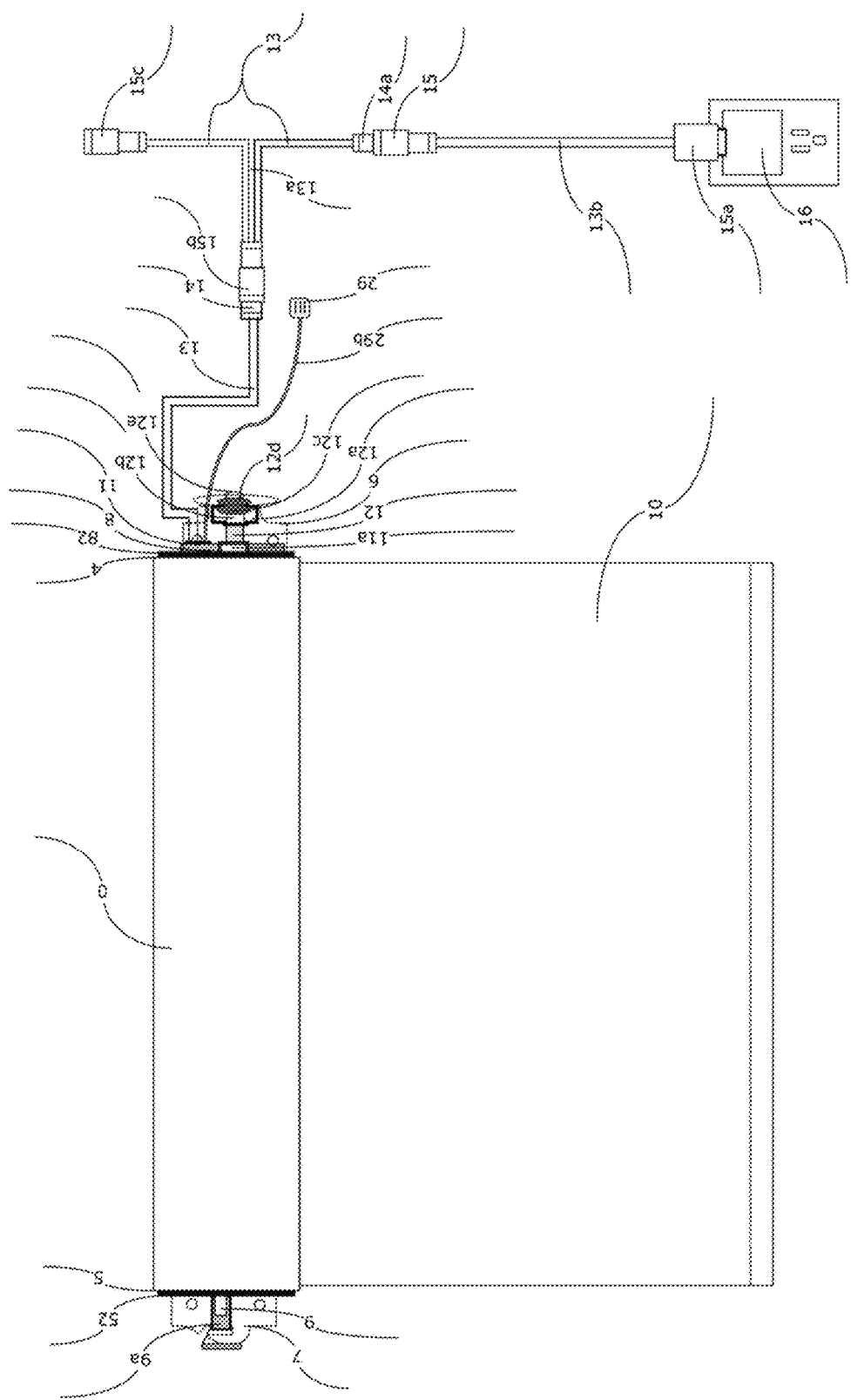
FIGURE. 2-A

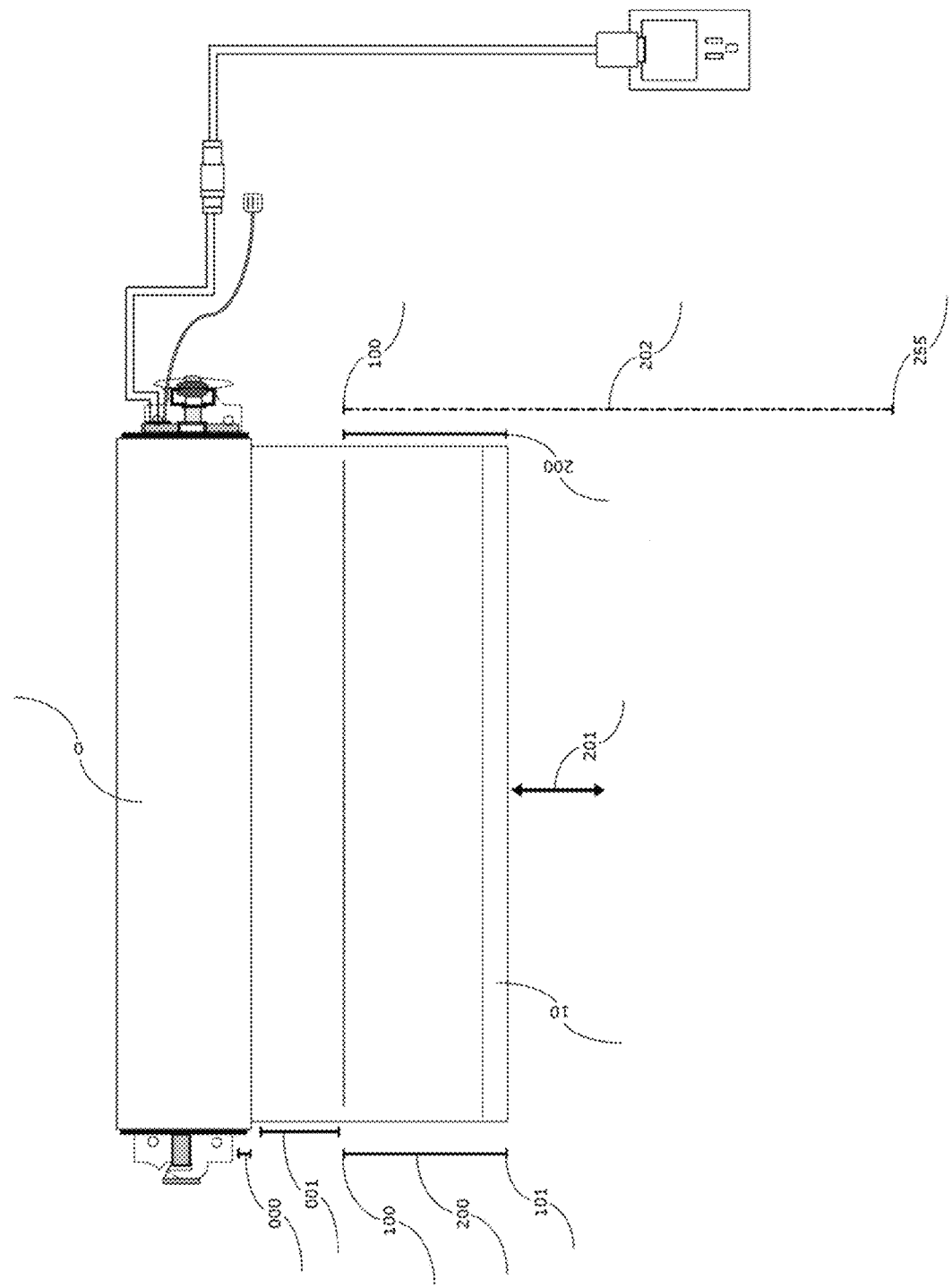
FIGURE. 3-A

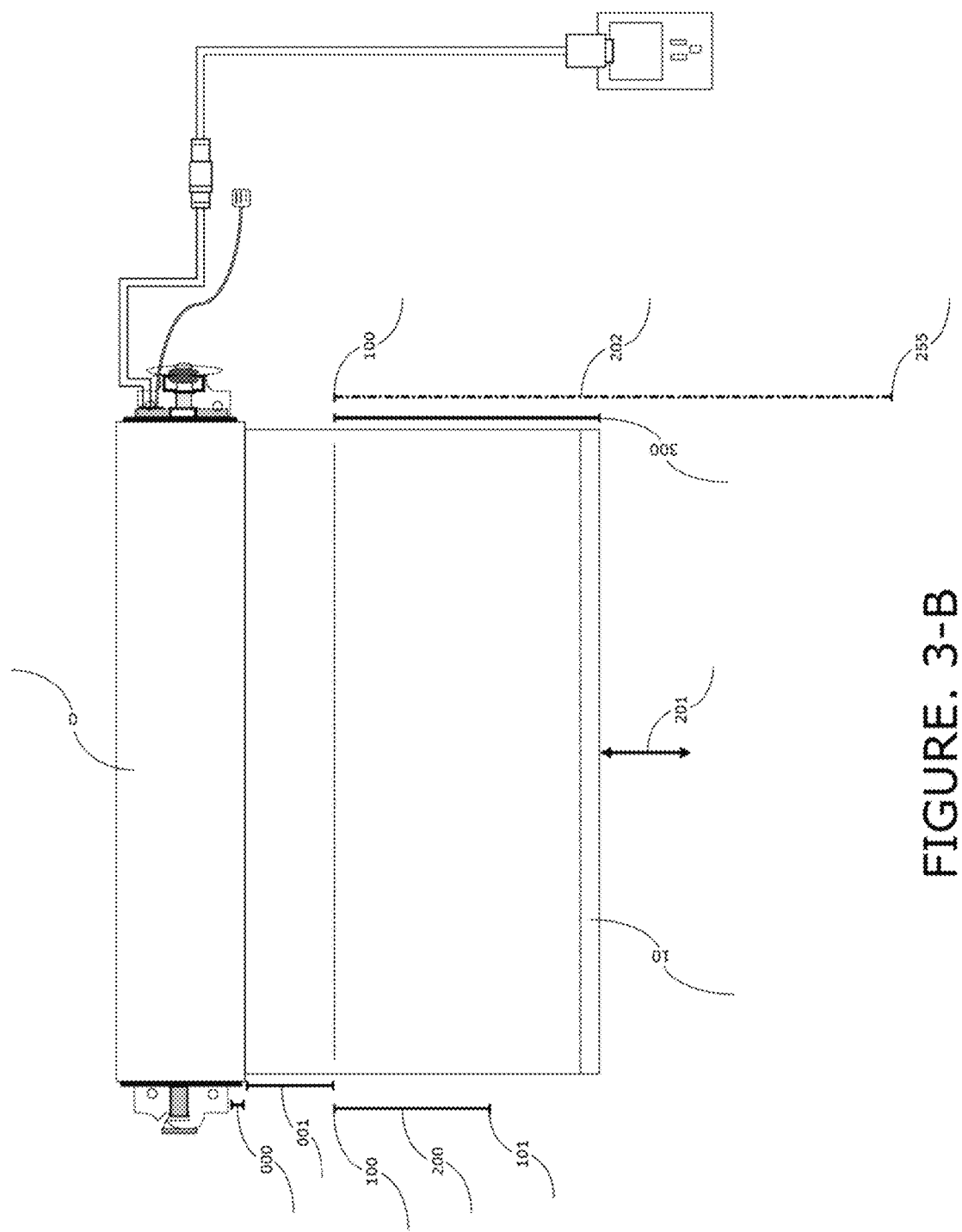
FIGURE. 3-B

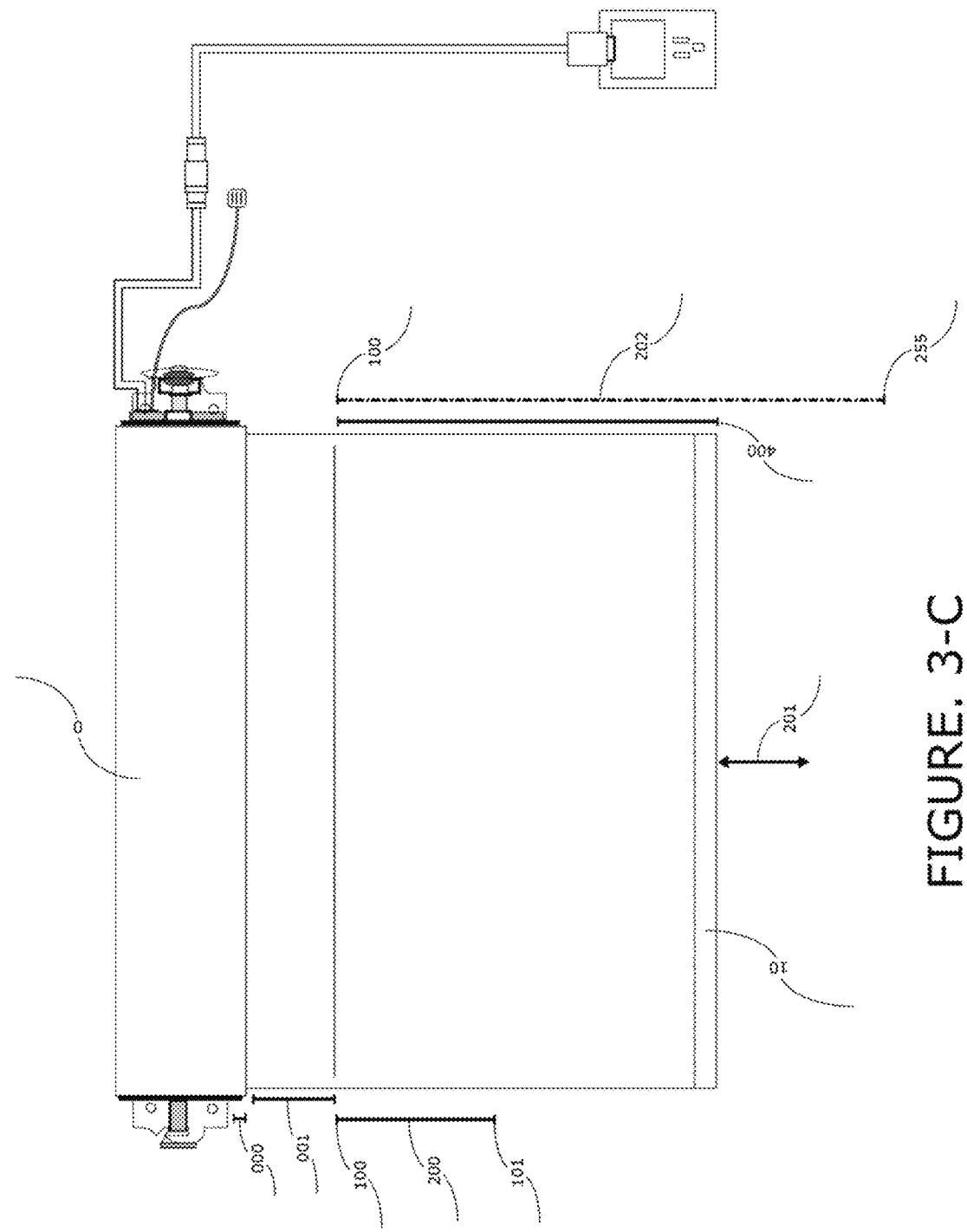
FIGURE. 3-C

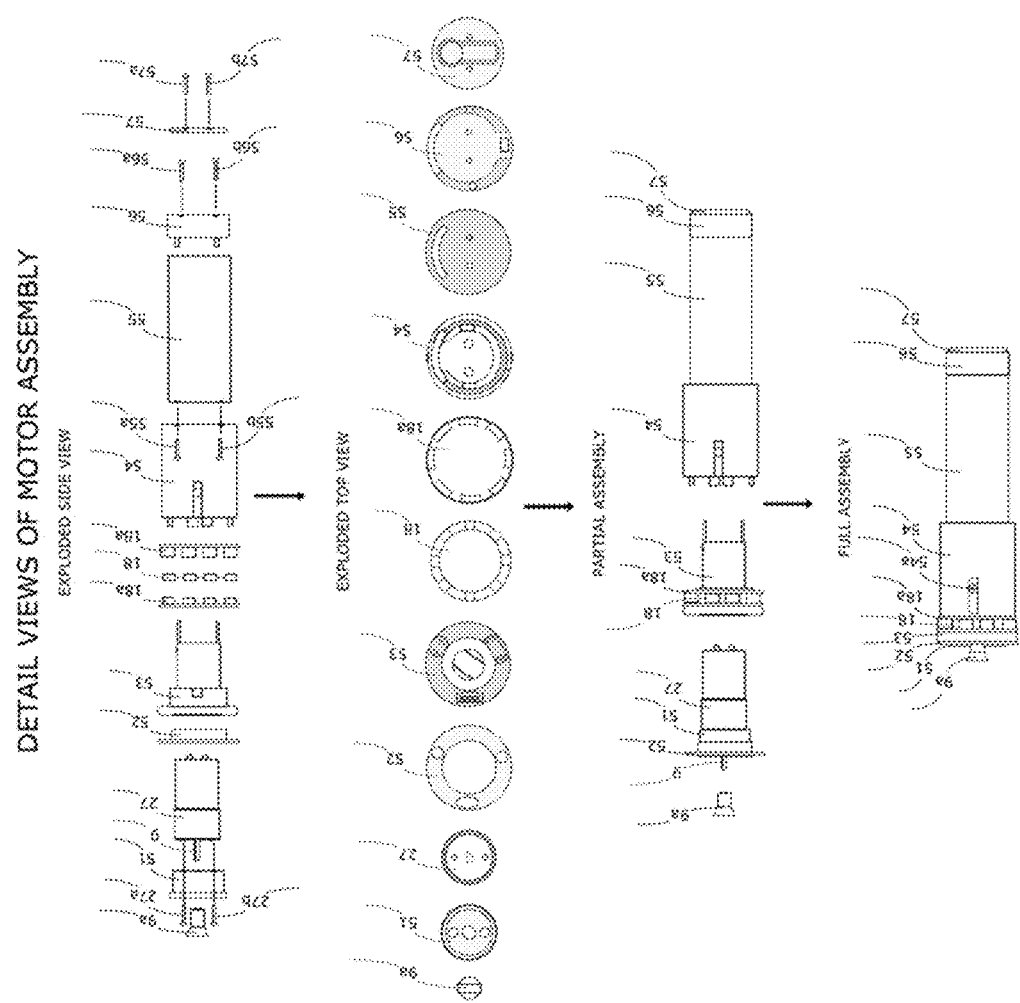
FIGURE. 4-A

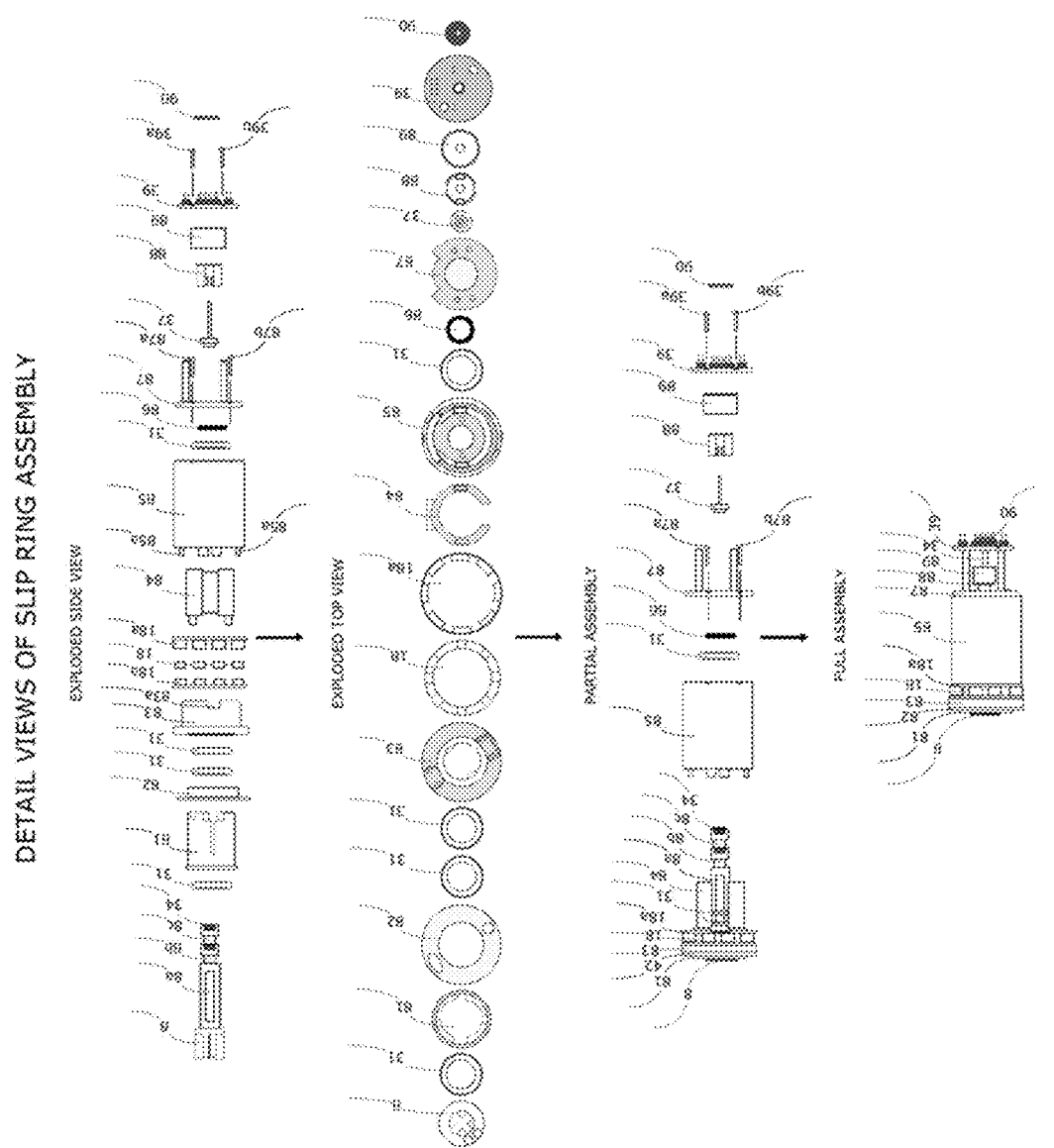

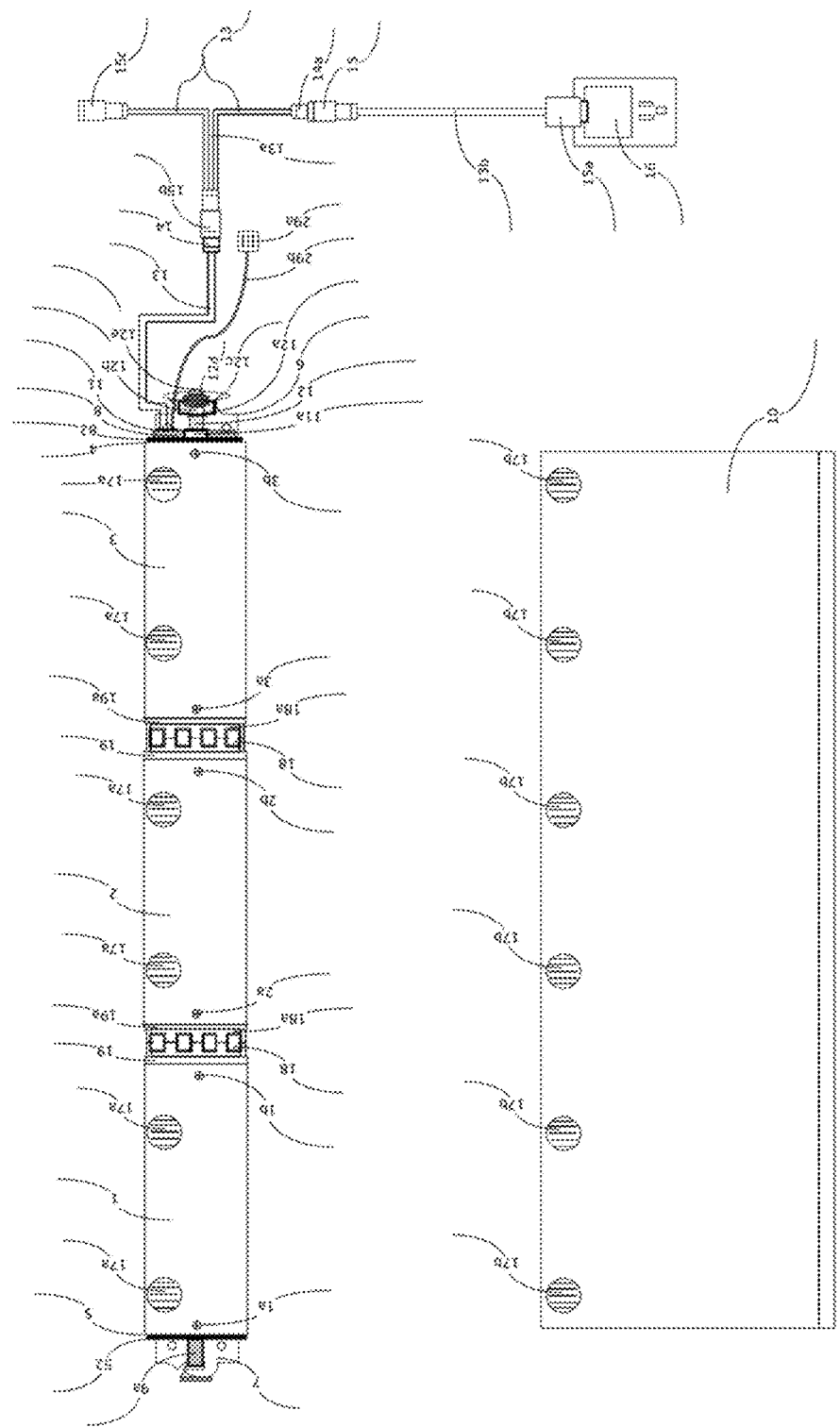
FIGURE. 6-A

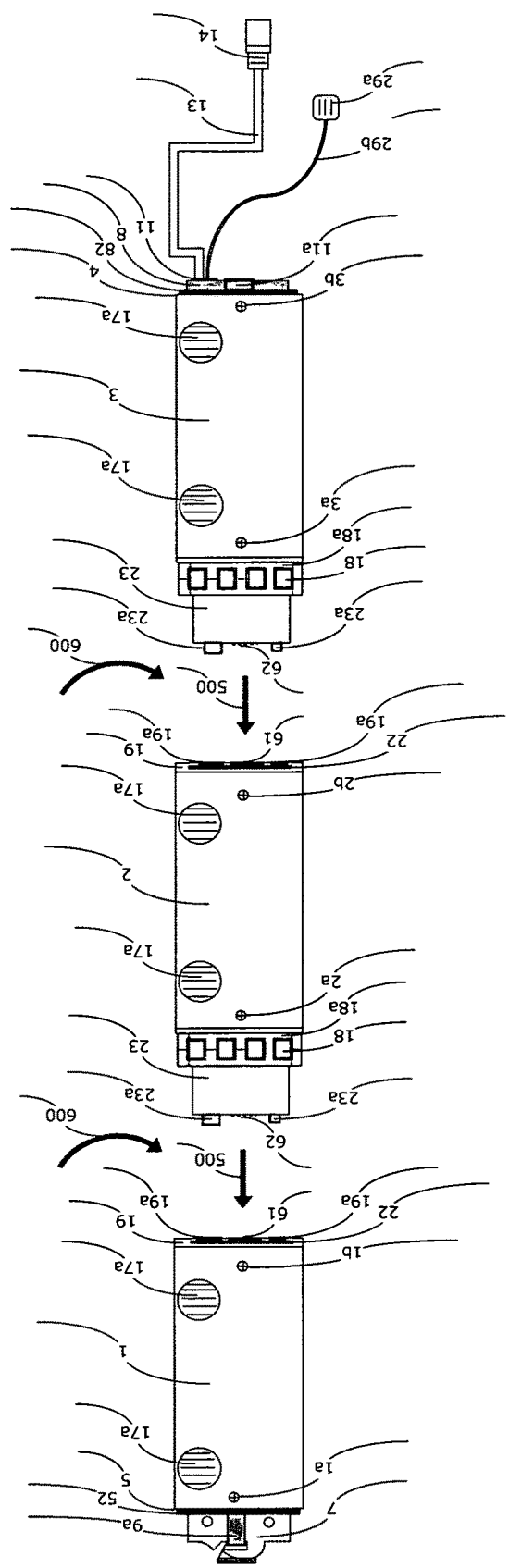
FIGURE. 7-A

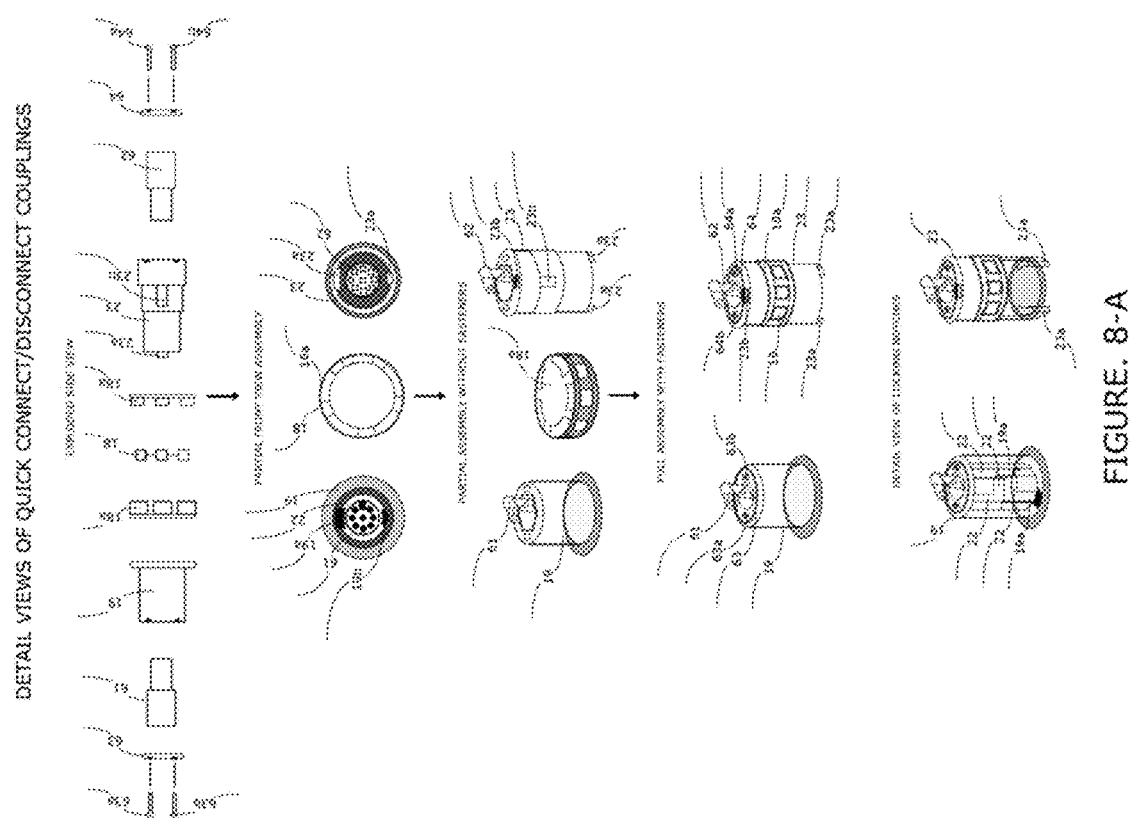
FIGURE. 8-A

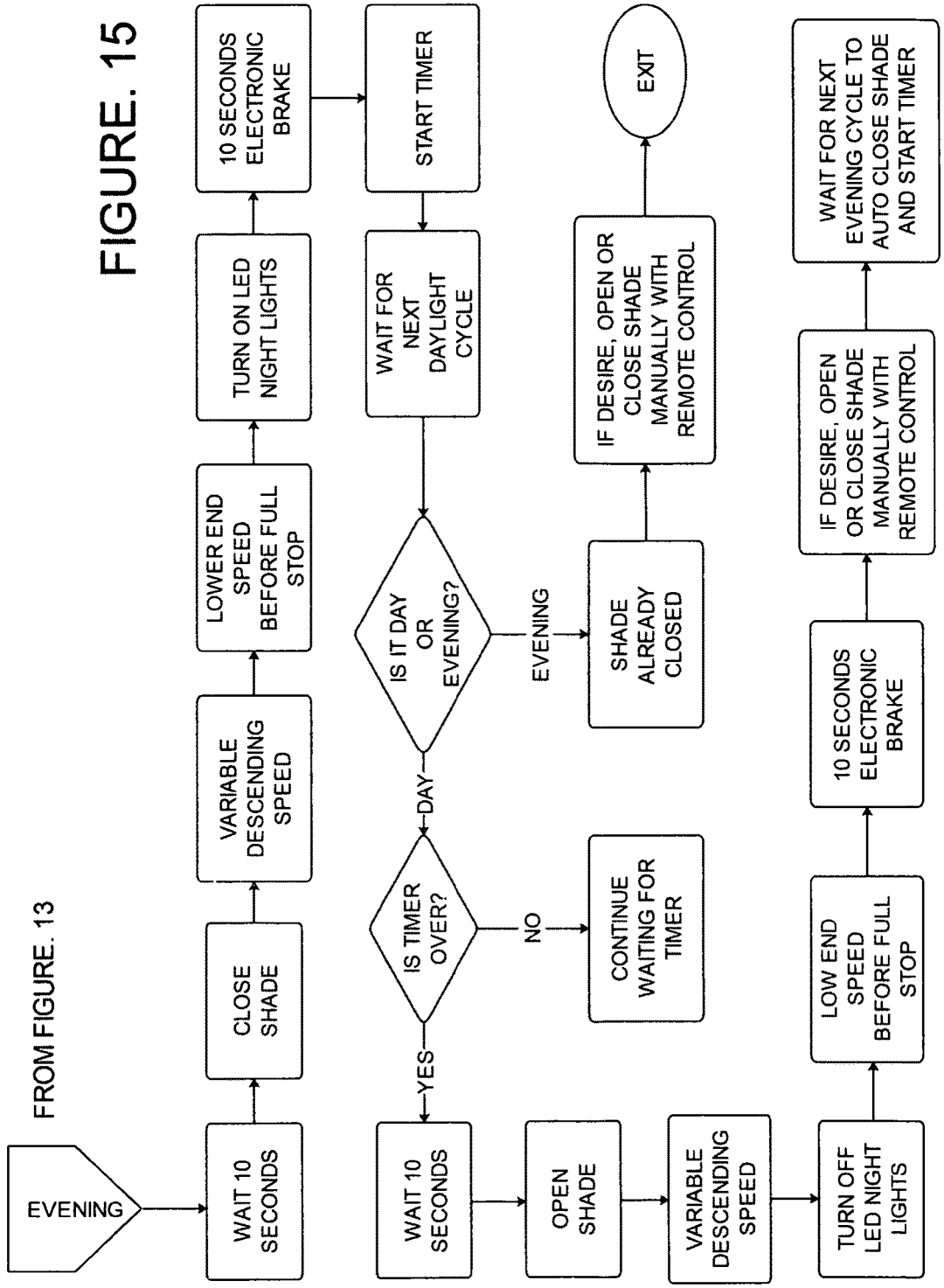

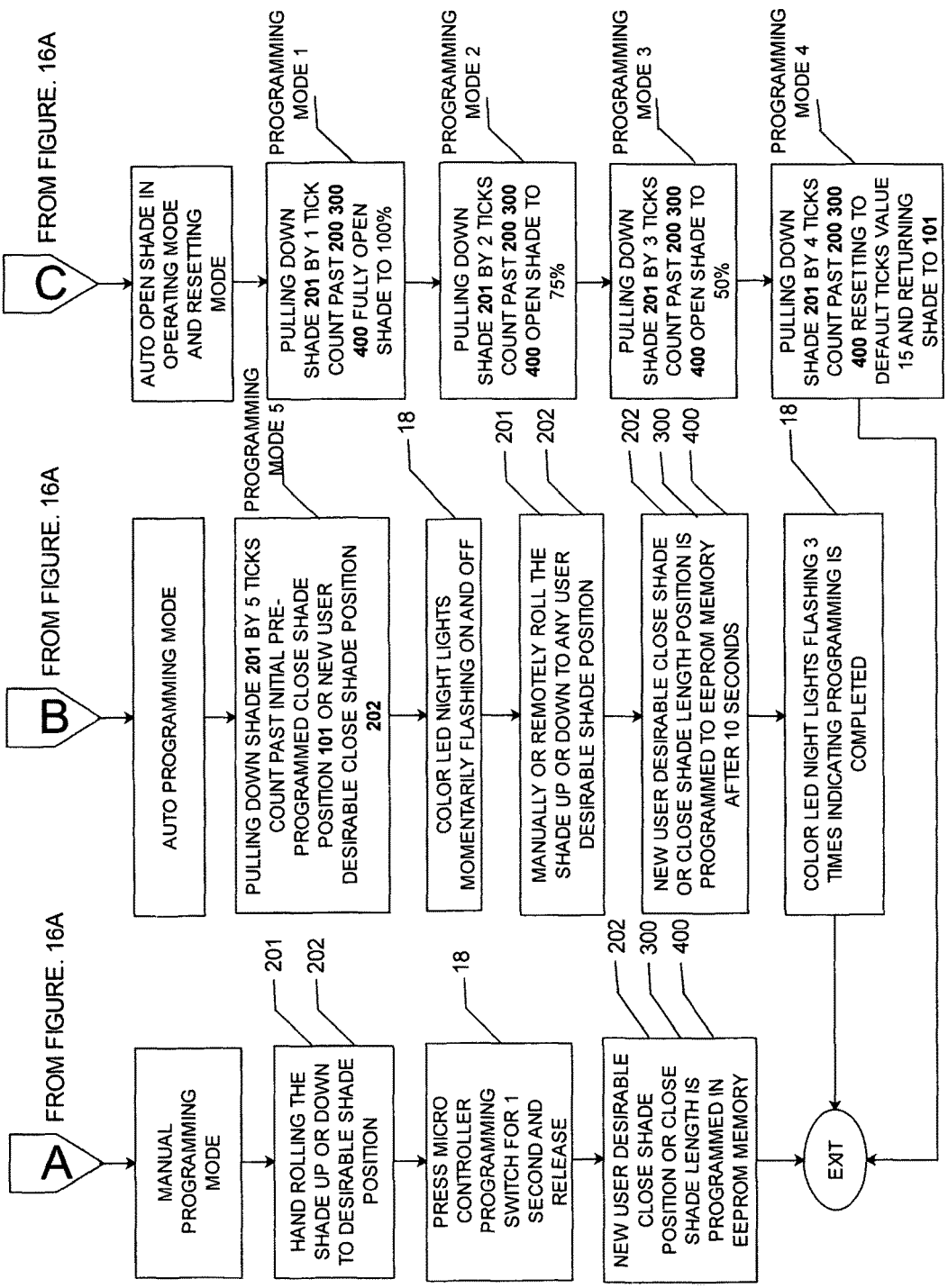

PROGRAMMABLE AND REMOVABLE AUTOMATIC MOTORIZED ROLLER SHADE WITH COLOR LED NIGHTS LIGHT AND METHOD

CROSS-REFERENCE TO RELATED APPLICATIONS

This application claims priority to U.S. Applications No. 62/350,103, filed Jun. 14, 2016, and U.S. Application No. 62/506,266, filed May 15, 2017. The content of the above applications are incorporated by reference in their entirely.

FIELD OF THE INVENTION

The present invention relates to the wireless remote control motorized roller shade, providing new benefits and functionalities including automatic shade open and close, built-in color LED night lights, automatic home position correcting feature, automatic new user desirable close shade position programming, programmable initial open shade home position, wireless adjustment of the photoresistor light level, programmable wireless remote control add-ons, optional second unit add-on extension cable, 5V USB low power supply input, built-in rechargeable lithium batteries with safety protection circuit, quick removable color shade fabric with mounting pads, small and lightweight, removable and foldable for portability. Besides the already enormous number of features and functionalities, there is an optional functionality upgradeable to bluetooth and wifi for technology savvy users preferring to have full control of the system through smart mobile devices.

BACKGROUND OF THE INVENTION

Motorized roller shade comprising a long tubular tube with electric DC geared motor attached to the tubular tube with shade fabric mounting on the surface. The motor is coupled on one end of the tubular tube with the motor shaft end fixed to the mounting bracket or having the motor mounted externally. The other end of the tubular tube, wherein the slip ring end is fixed on the bracket allowing free spinning of the tubular tube. When wired remote or wireless remote control is activated, the wireless receiver sends the signal to the main micro controller. The controller energizes the motor causing the motor to roll up or down depending on which pole of the motor is being energized with positive or negative wire.

U.S. Pat. Nos. 8,368,328, 8,299,734 to Mullet disclosed a method and a high efficiency roller shade. However, the system lacked removable tubular tubes and removable color shade fabric. Within the tubular tube, the hollow space accommodated 6 to 8 D-cell alkaline, non-rechargeable batteries. The overall physical appearance of the tubular tube is bulky and lacking both internal and external color LED night lights. Furthermore, the system lacked automatic functionalities such as auto open and close window shade, auto home position correcting, programmable initial open shade home position, auto programming of new user desirable close shade position and programmable remote control add-ons.

The method in operating the high efficiency roller shade in U.S. Pat. Nos. 8,368,328, 8,299,734 having undesirable drawbacks such as detecting the manual shade movement using a reed sensor as a switch to start the pulses count of the position encoder and the use of end-of-travel stop bar at the bottom of the shade to stop the motor and reset the position encoder counter to zero. When downward movement is detected by a reed switch, the micro controller begins counting the encoder generated by the rotation of the shade tube until the encoder pulses stop.

The method in operating the high efficiency roller shade in U.S. Pat. Nos. 8,368,328, 8,299,734 is based on the calculation and comparison to determine the displacement of the shade to the known maximum displacement. The calculation steps include linear displacement, distance/pulse conversion factor or pulse/distance conversion factor, outer diameter of shade tube, outer diameter of the fully-wrapped shade, the length of the shade tube, the thickness of the wrapped shade material. When moving the shade to the 100% open position, accumulated pulse counter is reset to 0 and the motor is stopped with an end-of-travel stop bar on the bottom of the shade engaging to the structure of the mounting brackets. Thus, having these undesirable drawbacks in calculating the number of pulses in order to determine shade position resulting in errors, inaccurate shade position, limited functionalities, no automatic programming and automatic operating features, having more external parts to break/replace and of course the cost of replacement parts and services.

In today world of technology, the uses of position encoders are quite common. Such position encoders include mechanical, laser, optical and magnetic. There are two different types of position encoders, linear and rotary. As the name implies, linear position encoders respond to motion along a path either in horizontal or vertical axis. Rotary position encoders respond to rotational motion. Such an example of rotary encoders is the volume knobs on a sound mixer. The position encoders are commonly categorized by means of the output as either absolute or incremental. The difference between absolute and incremental position encoders is that the absolute encoders provide an absolute numerical value for each angular position even over several revolutions while incremental encoders generate a precisely defined number of pulses per revolution by counting the pulse from a beginning point.

These two types of position encoders normally categorized as either absolute linear encoder, incremental linear encoder, absolute rotary encoder or incremental rotary encoder. Other type of incremental position encoder is incremental quadrature encoder. The incremental quadrature encoder is a bidirectional encoder using two output channels A and B to monitor both position and direction. Although, these position encoders are not limited to motorized roller shade. Variety of position encoders have been widely used in many applications, from robotics to automobiles. Such applications including DJ mixers, remote control toys, 3D printers, CNC machines, washer/dryer machines and many other consumer and industrial applications etc. Choosing the right position encoder in an application is very important and advantageous in cost saving, functionality, reliability and durability of life-long usage of the invention.

Despite a numerous number of inventions, many past and current motorized roller shades on the market suffered from the overall design characteristics, functionalities, durability, portability and cost. Many operated on external batteries, external wired remote control, infrared remote control and non-programmable remote control. Unfortunately, these are either do it yourself kit, heavy and bulky, not programmable, no auto home position correcting, too expensive, tubular tube and shade fabric is not removable, not fully automatic, no built-in color LED night lights, no backup rechargeable batteries and required at least 12 VDC or 120 VAC input power supply to operate resulting in waste energy, unsafe and unreliable.

Therefore, there is a need for a compact all-in-one automatic programmable and removable motorized roller shade with color LED night lights with many features and functionalities to solve the existing problems as well as improving the human living standards in today world of smart technology.

SUMMARY OF INVENTION

The present invention includes embodiments design to benefit anyone especially the elderly and the handicapped person in providing automatic shade open and close functionality, auto shade length position programming, auto home position correcting. Other benefits including an easy to use, quiet and reliable operation, safely operation of rechargeable batteries while charging and discharging, no batteries to replace and continuous battery power in the event of electricity blackout. When necessary, programmable wireless remote control functionality comes in handy for programming additional remote controls, turning on and off color LED night lights, resetting to default settings and manually open and close the shade any time of day and night.

One embodiment includes a number of removable parts comprising removable color shade fabric, optional foldable/removable multi sectional decorative bar, removable tubular halves joined together with at least one set of quick connect/disconnect male and female couplings, removable USB power supply adapter, power supply extension cable, second unit add-on power supply cable, and cone-shaped motor shaft end. The removable parts design for quick and simple installation and removing from the existing mounting brackets. The tubular halves can easily be taken apart and fold.

In one embodiment, a single automatic programmable and removable motorized roller shade with color LED night lights is directly connected to the 5V USB main power supply through a power cable. One end of the power cable comprising a 2-wire double crimped JST male connector, the other end comprising a USB Type A connector. In another embodiment, a single automatic programmable and removable motorized roller shade with color LED night lights is connected to an optional second unit add-on cable with 2-wire JST male connectors providing power to a second unit wherein the installing location lacking a power outlet.

In one embodiment, a battery on-off switch is embedded on the outer ring of the motor assembly for enabling and disabling battery backup and charging, a battery status LED indicating if the battery is charging, a remote control programming switch for programming extra remote fobs. The inner space of the motor assembly housed a DC geared motor, wherein the motor shaft comprising a coned-shaped end adapter for quick mounting and removing from the mounting bracket.

In one embodiment, a micro controller programming switch is embedded on the outer ring of the slip ring assembly providing an option for programming new user initial open shade home position. Located at 6 o'clock, an internal photoresistor sensor sensing the brightest or darkest light level to automatically open and close the window shade without the needs of human intervention. An external photoresistor may be attached to the outer end of the slip ring shaft for both manual and auto light level adjustment. One advantage of the internal or external photoresistor sensor is the controlling of built-in color LED night lights. The second advantage is detecting the amount of light level. The built-in color LED night lights providing an exciting colorful decorative environment in the dark of night as well as a convenience option without having to buy a separate night lights.

In one embodiment, the outer end of the slip ring shaft having a center cavity resembling a "+" shaped is attached to a flat rectangular shaped pin, wherein the flat rectangular shaped pin is fastened to the mounting bracket using a plastic cover, a nut, fasteners and a screw. The power supply wires with JST connector providing a quick connecting and disconnecting junction to the main USB power extension cable and second unit add-on cable.

In one embodiment, there are six different removable color shade fabrics and matching color LED night lights to choose from red, white, blue, green, purple and orange. Each unit having the same matching colors such as the color of the removable shade fabric, the color of battery status LED and the color of built-in LED night lights. The reason for having the same matching colors is to limit the distraction during the night. For example, when the system charges the battery at night, having a different combination of red battery status LED and a green LED night lights would cause irritation and discomfort to the eyes because each color LED producing different levels of brightness. Hence, having the same color of LED lights, producing the same level of brightness, thus reduces distraction.

In one embodiment, electronic components are embedded inside a 1.25 inches or smaller diameter tubular tubes allowing a much more compact design and reliable operation. Although, having quite a number of replaceable components is advantageous in which each part can be made even smaller to be embedded in even smaller diameter tubular tubes. Thus, the smaller the tubular tubes, the smaller the weight asserting on the motor resulting in quiet and reliable operation of the unit.

In one embodiment, the present invention introduces software-based technique interfacing with a 6-pole, 12 CPR or count per revolution magnetic quadrature incremental encoder through interrupts. Note that any number of CPR can be used. However, a 12 CPR encoder was chosen for a particular reason.

The use of two channels A and B to sense position and direction allowing the two code tracks with sectors positioned 90 degrees out of phase and the two output channels of the quadrature incremental encoder indicating both position and direction of rotation as shown in FIG. 11. If A leads B, the shade is rotating in a clockwise, close shade position. If B leads A, the shade is rotating in a counter-clockwise, open shade position. Quite simply, the shade can be open, close and stop at any position and direction.

The rotation of the quadrature incremental encoder output signals through interrupts is called a tick or ticks count per revolution. Different quadrature incremental encoder emits a given number of ticks count per revolution with the number of ticks count increment by 1 when closing the shade in clockwise direction and decrement by 1 when opening the shade in counter-clockwise direction.

The positive benefit in choosing to use a quadrature incremental encoder is that the rotation of tick or ticks count is generally unlimited. However, when interfacing with micro controller through software-based technique, the number of tick or ticks count can be limited to a certain minimum, maximum or any value between the minimum and the maximum. These values led to the introduction of reference points for programming shade length position, controlling the movement of shade in both position and direction, pulling down the shade past reference points to program the shade and automatically open the shade to any certain level, etc.

To further describe the summary of the present invention, the numbers inside parentheses are referring to FIG. 3, FIG. 3-A, FIG. 3-B, FIG. 3-C and FIG. 16 for clarity.

In this case, the lowest minimum number of tick count value 0 is used as original top reference point (000) defined as original minimum open shade home position (000), wherein the shade is fully open to the top. The chosen limited maximum number of ticks count value 255 is used as original bottom reference point (255) defined as original chosen limited maximum close shade position (255), wherein the shade (10) is fully close to the bottom.

The number of ticks count between the lowest minimum value 0 (000) and the chosen limited maximum value 255 (255) is defined as new user desirable close shade position (202). Since original top (000) and bottom (255) reference points are known, any ticks count value between 0 and 255 can be chosen and pre-programmed to be used as new reference points (100), (101), (102), (103), . . . for the purpose of shade position or shade length position programming and other automatic functionalities.

For example, a lower minimum number of ticks count value of 5 is chosen as new top reference point (100). The new top reference point (100) is defined as initial pre-programmed open shade home position (100). The shade length distance between the original top reference point (000) and the new top reference point (100) is generally defined as initial pre-programmed open shade length home position (001).

Another lower number of ticks count value 15 is intentionally chosen as new bottom reference point (101). The new bottom reference point (101) is defined as initial pre-programmed close shade position (101). The shade length distance between the original bottom reference point (255) and the new bottom reference point (101) is generally defined as initial pre-programmed close shade length position (200). The shade length distance between the initial pre-programmed close shade position (101) and any new user desirable close shade position (202) is generally defined as new user desirable close shade length position (300), (400), so on . . . .

As the name implies, the chosen initial pre-programmed open shade home position (100) is the open shade home position that is pre-programmed to tell the micro controller to leave home and return to home position at the pre-programmed ticks count value 5. Any ticks count value between 0 and 255 can be programmed as the chosen initial pre-programmed open shade home position (100), chosen initial pre-programmed close shade position (101) or as new user desirable close shade position (202). However, for the chosen initial pre-programmed open shade home position (100), a ticks count of 5 was chosen to give the shade (10) a decorative element by hanging a few inches (001) below the tubular tube (0) allowing easy access when user performing programming steps.

Likewise, the chosen initial pre-programmed close shade position (101) is the close shade position that is pre-programmed to tell the micro controller to go from initial pre-programmed open shade home position (100) to initial pre-programmed close shade position (101) when the user operates the unit for the first time. The new user desirable close shade position (202) is any user desirable programmed close shade position wherein the number of ticks count value is anywhere between 0 and 255.

Trial and error has been done in choosing the best limited maximum number of ticks count value (255) or original bottom reference point (255) defined as original chosen limited maximum close shade position (255). Note that any number of ticks count can be chosen as limited maximum ticks count (255) because the ticks count of a quadrature incremental encoder is large or generally unlimited, meaning the number of ticks count is counting indefinitely.

Thus, the lower maximum number of ticks count covering a shorter window length area and the higher maximum number of ticks count covering a longer window length area. For example, moving the shade from the initial pre-programmed open shade home position (100) with ticks count value 5 to the initial pre-programmed close shade position (101) with ticks count value 15 covering approximately 2 feet of window length area (200). Moving the shade from initial pre-programmed open shade home position (100) with ticks count value 5 to a new user desirable close shade position (202) with ticks count value 60 covering approximately 8 feet of window length area and so on . . . .

Therefore, a common byte value is chosen. Since a byte in a binary of 8 bits is equal to a decimal value of 255, moving the shade from the original minimum open shade home position (000), tick count value 0 to the original chosen limited maximum close shade position (255), ticks count value 255 covering up to 34 feet window length area. As a result, the chosen limited maximum number of ticks count 255 is generously enough to cover any physical window length.

In another embodiment, the present invention uses an Atmega328P micro controller to control every process of digital and analog inputs and outputs. One of the process or method of using software-based technique for automation is automatic shade position programming such as initial pre-programmed open shade home position (100), initial pre-programmed close shade position (101) and new user desirable close shade position (202). By interfacing a quadrature increment encoder with an Atmega328P micro controller interrupts, the output signals of the quadrature incremental encoder in the form of tick or ticks count providing reference points for instant movement of shade position from any position.

The advantage of a quadrature incremental encoder is the ability to monitor both the location and direction when interfacing with external hardware interrupts functionality. Each hardware interrupts has its own Interrupt Service Subroutine or ISR which can be triggered independently by either a low signal, high signal, change signal, rising signal or falling signal. LOW signal triggers the interrupt whenever the pin is low, HIGH signal triggers the interrupt whenever the pin is high, CHANGE signal triggers the interrupt whenever the pin changes in value, RISING signal triggers the interrupt whenever the pin goes from low to high, FALLING signal triggers the interrupt whenever the pin goes from high to low.

For example, Signal A is connected to an Atmega328P external interrupt 0 and signal B is connected to interrupt 1. The meaning of interrupts is the processing of the encoder signals only when the signals arrive to the controller. Using the interrupts function to activate the interrupts and call the function to the interrupt 0 and interrupt 1 whenever the signal changes from low to high clock. Alternatively, software interrupts such as pin change interrupts may be used on all micro controller pins which sharing an ISR. However, pin change interrupts is slower and more complicate to use than the readily available external hardware interrupts.

In conclusion the present invention using the lowest minimum tick count value 0 as original top reference point (000) defined as original minimum open shade home position (000). Using lower minimum ticks count value 5 as new top reference point (100) defined as initial pre-programmed open shade home position (100). Using a second lower ticks count value 15 as new bottom reference point (101) defined as initial pre-programmed close shade position (101). Using chosen limited maximum ticks count value 255 as original bottom reference point (255) defined as original chosen limited maximum close shade position (255). Any ticks count value between the initial pre-programmed open shade home position (100) and the original chosen limited maximum close shade position (255) is defined as new user desirable close shade position (202).

When the close command is received either from the photoresistor sensor, remote control, bluetooth or wifi, the window shade simply moves to any position between the initial pre-programmed open shade home position (100) to the initial pre-programmed close shade position (101) or new user desirable close shade position (202) depending on the programmed parameters.

For example, if the initial pre-programmed open shade home position (100) is 1 and the initial pre-programmed close shade position (101) is 255, the shade moves from top to bottom "1<position<255" or bottom to top "255>position>1" depending on the current open or close command. If the initial pre-programmed open shade home position (100) is 5 and the initial pre-programmed close shade position (101) is 15, the shade moves from top to bottom "5<position<15" or bottom to top "15>position>5" depending on the current open or close command. Similarly, if the initial pre-programmed open shade home position (100) is 5 and the new user desirable close shade position (202) is 120, the shade moves from top to bottom "5<position<120" or bottom to top "120>position>5" depending on the current open or close command. Note that the window shade is originally moving from top to bottom between 1 and 255. If switching the quadrature incremental encoder wires or reversing reference points and modifying programming parameters, the original movement of shade from top to bottom is rotating in reverse between 255 and 1 having no impact on the method and operation of the present invention.

To further expand the flexibility of auto position correcting and automatic shade length adjustment programming functionality, the use of built-in timers and EEPROM memory providing the solutions. The auto position correcting is an operating feature that auto return the shade to the initial pre-programmed open shade home position (100).

Let imagine a user installing a newly acquired programmable and removable auto window shade with color LED night lights. The user first mounted the unit at the top up position over a common 4 feet window length area located in front of the living room. As a new user, the user has no idea regarding the position stored inside the system memory. The user proceeds with installation anyway by plugging in the power supply and turning on the battery switch locating on the left side of the unit.

The user has the remote control and is ready to press the buttons. When the close shade button is pressed, user notices the shade is not moving to the expected shade position. User then presses the open shade button and surprisingly, the window shade is rolling upward for a period of time and stopping at the top up position. At this point, the window shade has done an auto position correcting toward the initial pre-programmed open shade home position (100), ticks count value 5. As user presses the close shade button again, the window shade starts descending to the initial pre-programmed close shade position (101) or close shade length position (200), ticks count value 15. User quickly realizes that the initial pre-programmed close shade position (101) (200) only cover 2 feet of window length area instead of covering the 4 feet of window length area.

Out of curiosity, user decides to cover the desired window length area by pulling down the shade (201) past the initial pre-programmed close shade position (101) (200). The color LED night lights slowly flashing on and off indicating programming mode and registering the new user desirable close shade position (202) or close shade length position (300) into memory after 10 seconds. At this point, color LED night lights quickly flashing 3 times and turning off indicating successful programming. The new user desirable close shade position (202) (300) is now programmed and could be any value greater than the initial pre-programmed close shade position (101). The color LED night lights may turn on depending on the light level detects by the photoresistor sensor. The user continues testing the remote functionality by pressing the remote open button, the shade (10) opening up to the initial pre-programmed open shade home position (100). User then presses the remote close button, the shade (10) is closing to the new user programmed desirable close shade position (202) (300) and fully covering the 4 feet window length area.

After an exciting moment, user decides to have a little bit of sunlight and a peeking out of a scenery front yard. User pulling down the window shade (201) once past the new user programmed desirable close shade position (202) (300) by 1 tick count, color LED night lights momentarily flashing 1 times entering operating mode 1. By 2 ticks count, color LED night lights momentarily flashing 2 times, the unit is entering operating mode 2. By 3 ticks count, color LED night lights momentarily flashing 3 times, the unit is entering operating mode 3. By 4 ticks count, color LED night lights momentarily flashing 4 times, the unit is entering resetting mode 4. By 5 ticks count or more, color LED night lights slowly flashing on and off indicating the unit entering programming mode 5 and so on.

After 10 seconds, the shade (10) automatically opening from the user desirable close shade position (202) (300) toward initial pre-programmed open shade home position (100). There are a total of 5 modes of operation. There are 3 operating modes to automatically opening the shade (10). Operating mode 1 opening shade to 100 percents, operating mode 2 opening shade to 75 percents and operating mode 3 opening shade to 50 percents, etc. . . . . Operating mode 4 resetting the current user desirable close shade position (202) (300) (400) to a default initial pre-programmed close shade position (101) or default initial pre-programmed close shade length position (200). Operating mode 5 is programming mode that is used in programming any new user desirable close shade position (202) (300) (400).

There are two other ways user can enter programming mode. One way is hand rolling the shade upward from initial pre-programmed open shade home position (100) to original minimum open shade home position (000), tick count value 0. Note that color LED night lights slowly flashing on and off indicating programming mode. Another way is quickly pressing the controller programming switch located on the outer ring of the slip ring assembly for 1 second. Note that any shade position programming higher than the initial pre-programmed close shade position (101) (200) registering as new user desirable close shade position (202) (300) (400). Any shade position programming lower than the initial pre-programmed close shade position (101) (200)

automatically registered as initial pre-programmed close shade position (101) (200), ticks count value of 15. The initial pre-programmed close shade position (101) (200) can be pre-programmed to a different value other than 15. However, ticks count value 15 is chosen for the benefits of design and operation of the present invention.

Additional operating modes, programming modes, resetting modes, remote control modes may be added to fulfill the automatic functionality of the unit. Remote control modes are the control methods that use the remote control open or close button to turn on and off the color LED night lights, resetting the unit to default initial pre-programmed close shade position (101) (200) or resetting the memory of the remote control, bluetooth and wifi to default setting wirelessly. For example, when the shade is fully closed at night, the color LED night lights automatically turning on. If the close button is pressed between 3 to 10 seconds depending on the programmed parameters, color LED night lights turning off. If close button is pressed again, color LED night lights turning on.

Moreover, the initial pre-programmed open shade home position (100), ticks count value 5 can be set to a new initial pre-programmed open shade home position (100) by pressing and holding the controller programming switch for 5 seconds and release, color LED night lights quickly flashing for a second entering programming mode. Hand rolling the window shade up or down to desired position then pressing and releasing the micro controller programming switch for 1 second, color LED night lights slowly flashing on and off registering the new initial pre-programmed open shade home position (100) into memory after 10 seconds. At this point, color LED night lights quickly flashing 3 times and turning off indicating successful programming.

In another embodiment, additional functionalities is employed in conjunction with the quadrature incremental encoder such as variable descending speed, lower end speed and 10 seconds electronic brake. By using micro controller analog PWM function to control the motor speed from various starting speed and decreasing to a lower end speed in multiple steps before a 10 seconds electronic brake is applied to fully stop the motor.

It has been known that many micro controllers used a PWM or Pulse Width Modulation for controlling analog circuits with digital outputs. The on-off patterns of digital controls generate a square wave signal with a specified duty cycle. The frequency of the PWM signal of the Atmega micro controller is either 490 Hz or 980 Hz depending on the support pins. The duty cycle is the decimal value between 0 and 255, where 0 is always off at zero speed and 255 is always on at full speed. For example, the present invention uses an Atmega328P micro controller having pin 5 and 6 running at 980 Hz. Pin 5 is assigned to energize the negative motor wire and pin 6 is assigned to energize the positive motor wire. Of course the micro controller does not have enough current to operate the motor. It energizes the motor through a separate motor driver.

To limit the full motor speed to 75%, 50%, 25%, 10%, etc when moving to close shade position, the negative wire of output pin 5 is programmed a duty cycle approximately 75% of 255, 50% of 255, 25% of 255, 10% of 255, etc which is 191, 128, 64, 26, etc. The positive wire of pin 6 is programmed a 0 which is off. To limit the full motor speed to 95%, 85%, 55%, 30%, etc when moving to open shade position, the positive wire of output pin 6 is programmed a duty cycle approximately 95% of 255, 85% of 255, 55% of 255, 30%, etc which is 242, 217, 140, 77, etc. The negative wire of pin 5 is programmed a 0 which is off. Thus, when moving from variable descending speed, the motor slowly transitions to a lower end speed and a 10 seconds timer activating electronic brake through a relay to completely stop the motor at the expected position.

In another embodiment, additional feature such as programmable wireless receiver comprising an Atmel ATtiny85 micro controller and MICREL MICRF002/RF022 or Synoxo SYN480R ASK 300-450 MHZ receiver embedded within the main Printed Circuit Board providing wireless operation of the window shade. One advantage of the programmable wireless receiver is that user can program replacement remote controls or adding extra remote controls either manually or wirelessly. In manual programming mode, user can program up to 6 remote controls while in wireless programming mode, user can program up to 5 remote controls. However, wireless programming mode required at least one registered remote control that is programmed in manual mode. Manual programming mode can be accessed using a remote control programming switch locating on the outer ring of the motor assembly. Accessing wireless programming mode is quick and simple using registered remote control open and close buttons. Despite various low cost replacement remote controls available, the operating frequency of remote controls is limited to 315 MHZ and 433 MHZ. Other operating frequency such as 900 MHZ, 2.4 GHZ, 5 GHZ can be employed. Unfortunately, the additional cost defeating the purpose of the present invention.

BRIEF DESCRIPTION OF THE DRAWINGS

FIG. 1-A is similar to FIG. 1 depicts a complete exploded front view of the longer version programmable and removable auto window shade showing left mounting bracket, cone shaped motor shaft end adapter, three removable tubular tubes, removable color shade fabric, motor assembly, slip ring assembly, slip ring shaft, external photoresistor, a flat rectangular shaped pin and fasteners, right mounting bracket, second unit add-on power supply cable, main power supply extension cable, and 5V USB power adapter.

FIG. 2-A depicts a complete isometric front view showing a complete assembly with second unit add-on cable is connected to the main power supply extension cable. The main power extension cable is connected to the USB power adapter.

Figure 1:
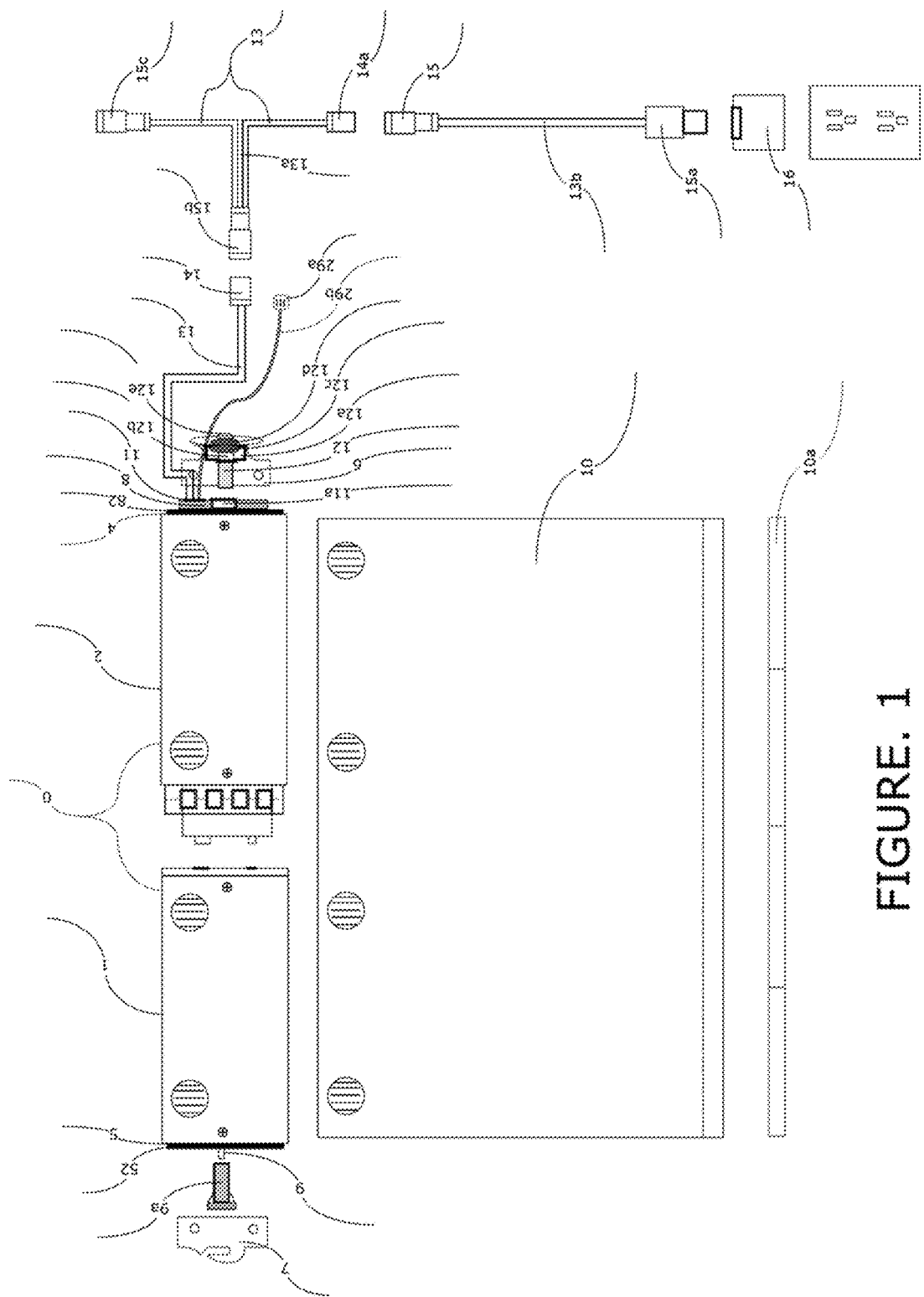
FIG. 1 depicts a complete exploded front view of the programmable and removable auto window shade showing left mounting bracket, cone shaped motor shaft end adapter, two removable tubular tubes, removable color shade fabric, motor assembly, slip ring assembly, slip ring shaft, external photoresistor, a flat rectangular shaped pin and fasteners, right mounting bracket, second unit add-on power supply cable, main power supply extension cable, and 5V USB power adapter.

The left vertical break line represents original pre-programmed top reference point (000) and bottom reference point (255). The ticks count value between top reference point (000) and bottom reference point (255) can be chosen as new reference points (100), (101), (102), (103) and so on. Reference point (100) has been chosen and pre-programmed as initial pre-programmed open shade home position (100).

Reference point (101) has been chosen and pre-programmed as initial pre-programmed close shade position (101) shown in the longest solid vertical line (200).

The shortest solid line (000) represents original top reference point (000) or original minimum open shade home position (000), tick count value 0. The medium solid line (001) represents the open shade length distance of the initial pre-programmed open shade home position (100). The longest solid line (200) represents the close shade length distance when the shade is closing from the initial pre-programmed open shade home position (100) to the initial pre-programmed close shade position (101). The double arrows solid line (201) represents the up and down movement of the shade (10).

The right vertical break line (202) represents new user desirable close shade position (202). Any ticks count value between original top reference point (000) and original bottom reference point (255) can be programmed by the user.

Figure 3:
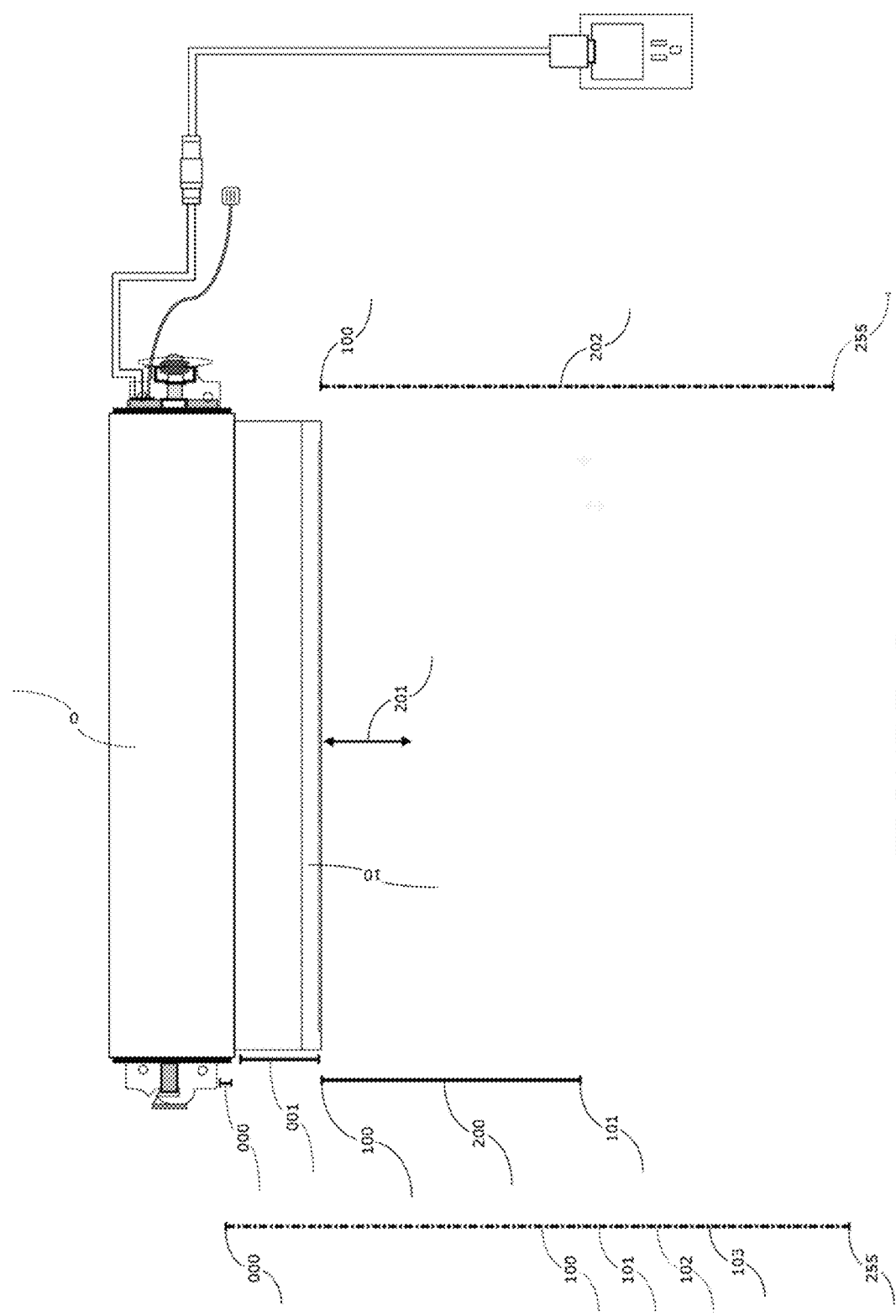
FIG. 3 depicts a complete isometric front view of an initial pre-programmed open shade home position (100).

FIG. 3-A depicts a complete isometric front view of an initial pre-programmed close shade position (101) (200), wherein the initial pre-programmed close shade position (101) (200) can be programmed to any new user desirable close shade position (202) using shade movement (201).

FIG. 3-B depicts a complete isometric front view of a new user programmed close shade position (202) (300), wherein the new user programmed close shade position (202) (300) is greater than the initial pre-programmed close shade position (101) (200).

FIG. 3-C depicts a complete isometric front view of another new user programmed close shade position (202) (400), wherein new user programmed close shade position (202) (400) is greater than the initial pre-programmed close shade position (101) (200).

Figure 4:
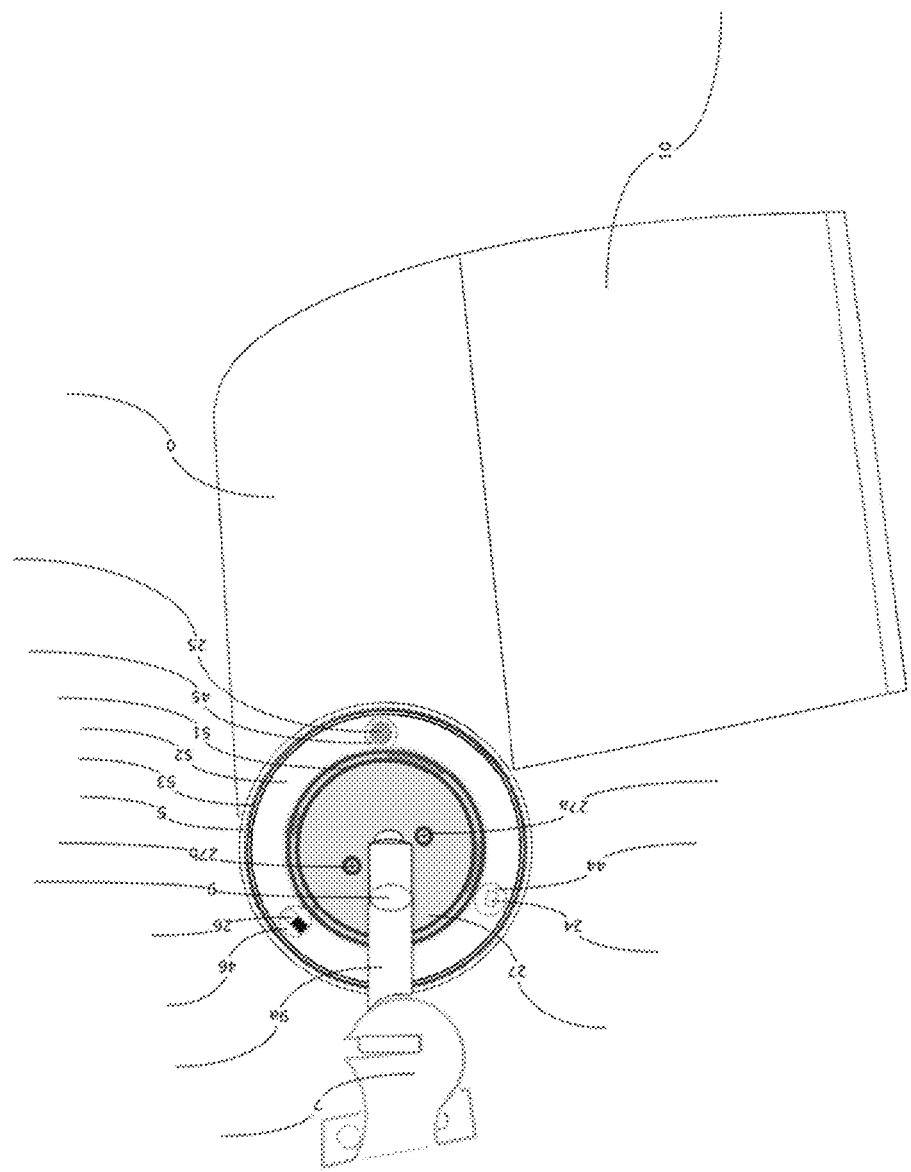

FIG. 4 depicts a partial isometric side view showing the motor assembly of the left end side.

FIG. 4-A depicts multiple detail views of the motor assembly.

Figure 5:
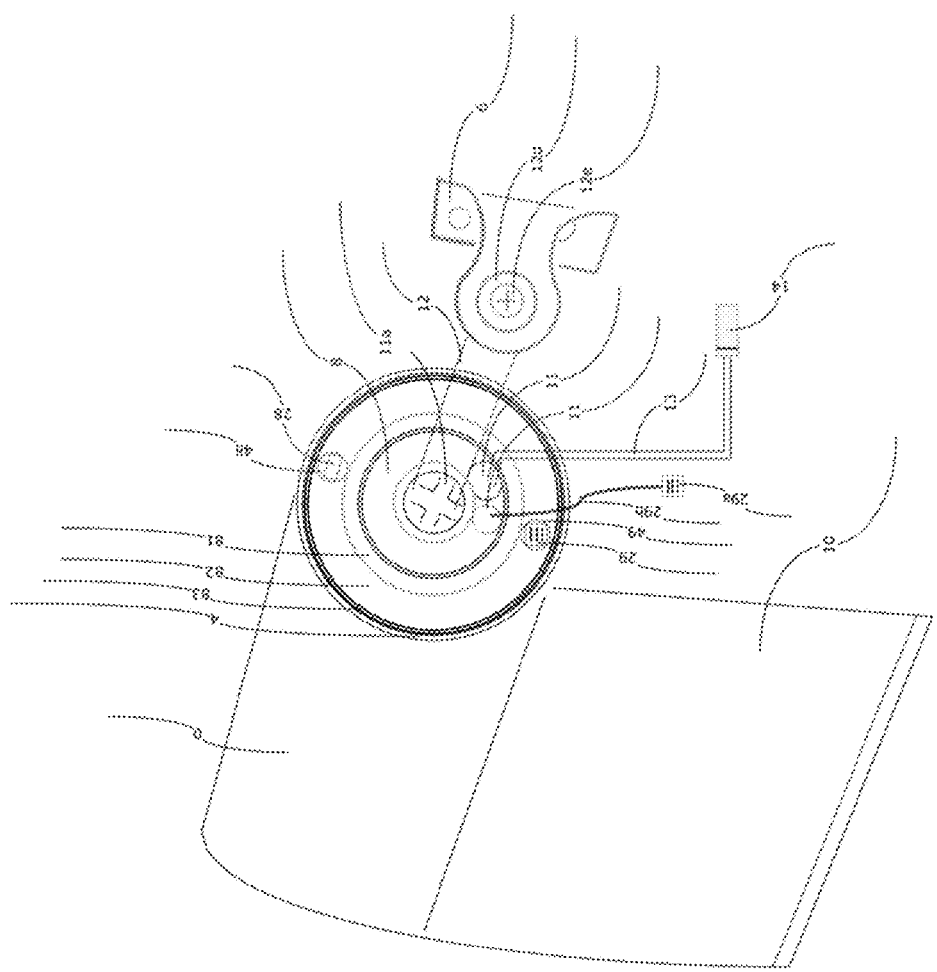

FIG. 5 depicts a partial isometric side view showing the slip ring assembly of the right end side and an external photoresistor sensor.

FIG. 5-A depicts multiple detail views of the slip ring assembly.

Figure 6:
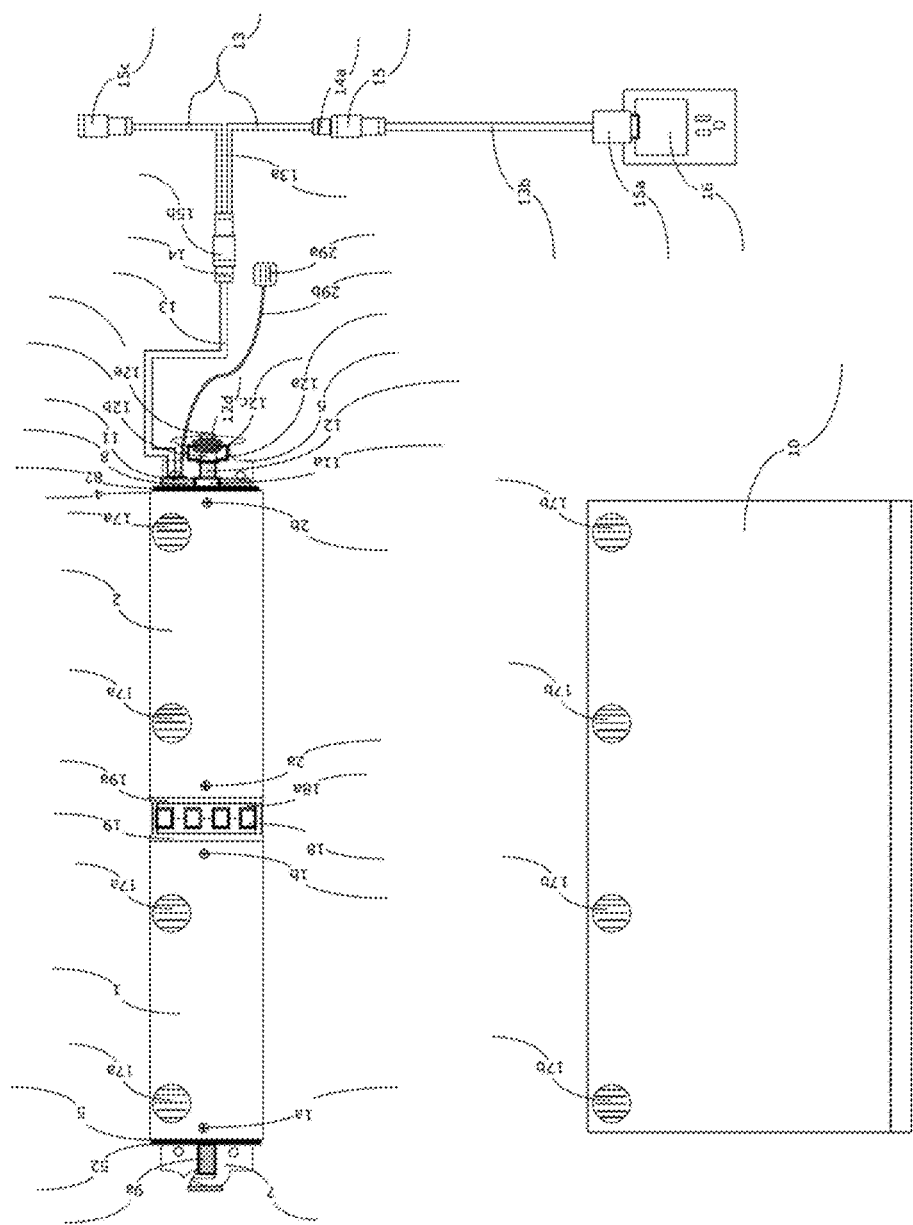

FIG. 6 depicts an isometric front view of the short version programmable and removable auto window shade assembly with two tubular tubes, one set of male and female quick connect/disconnect couplings, one set of external LED night lights, LED night lights cover and removable shade fabric mounting pads.

FIG. 6-A depicts an isometric front view of the longer version programmable and removable auto window shade assembly with three tubular tubes, two sets of male and female quick connect/disconnect couplings, two sets of external LED night lights, two LED night light covers and removable shade fabric mounting pads.

Figure 7:
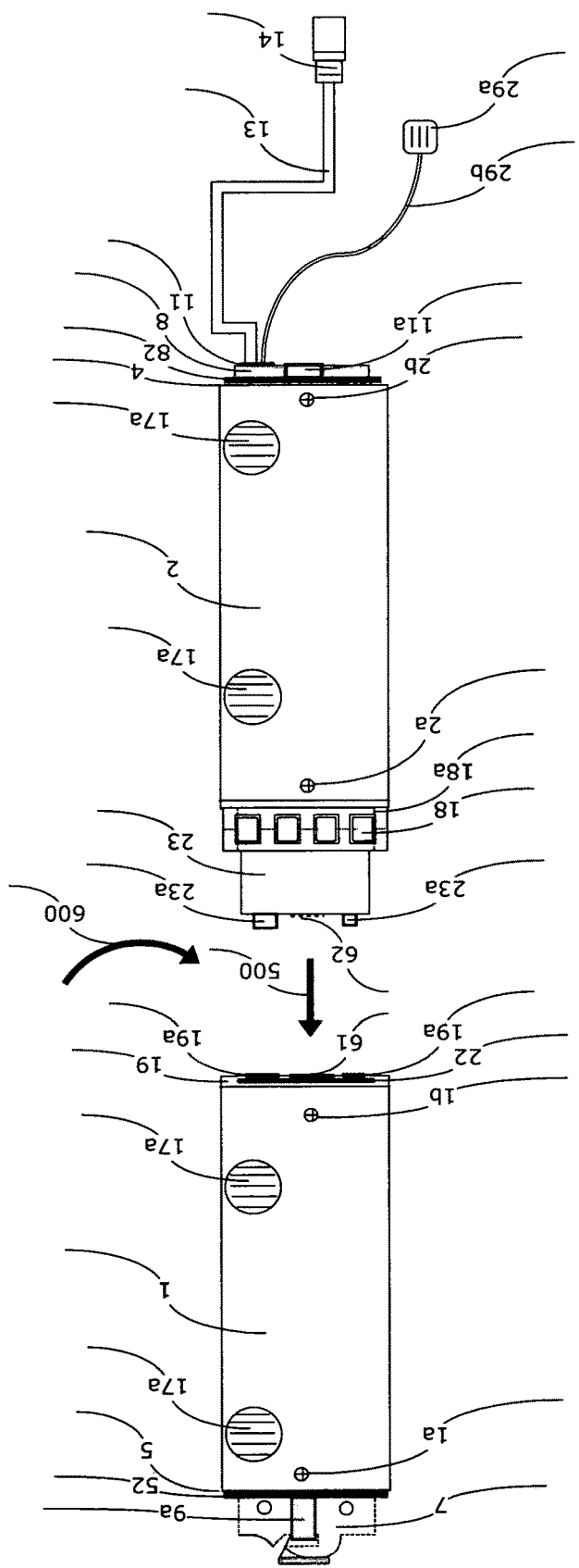

FIG. 7 depicts an isometric front view of the short version programmable and removable auto window shade assembly showing the removable portions of the tubular tube exposing male and female quick connect/disconnect couplings as well as the direction and locking position.

FIG. 7-A depicts an isometric front view of the longer version programmable and removable auto window shade assembly showing the removable portions of the tubular tube exposing two sets of male and female quick connect/disconnect couplings as well as the direction and locking position.

Figure 8:
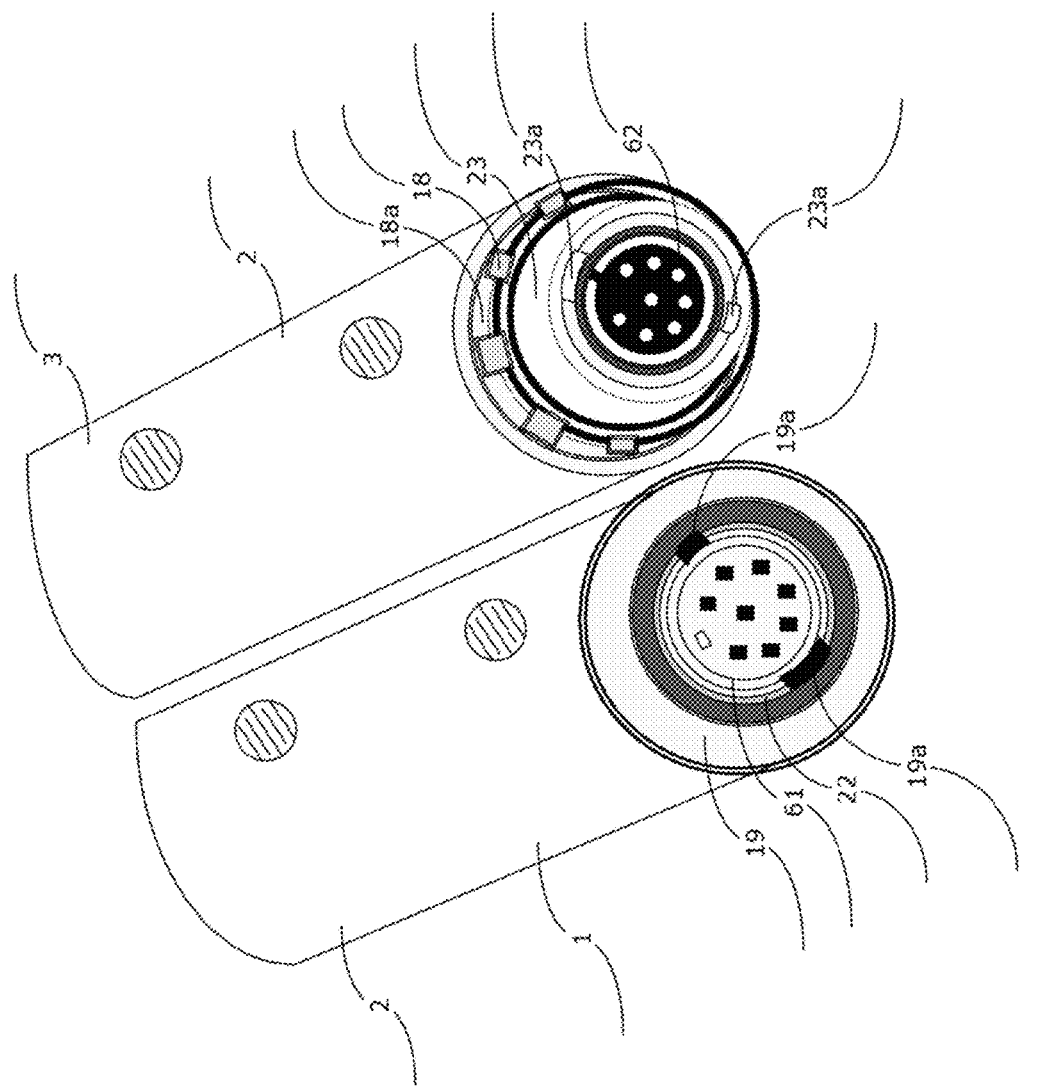

FIG. 8 depicts an isometric view of the programmable and removable auto window shade assembly showing the separation and folding between two joined tubular tubes 1,2 and 2,3 exposing the removable male and female quick connect/disconnect couplings, locking notch, and connectors.

FIG. 8-A depicts multiple detail views of female and male quick connect/disconnect couplings.

Figure 9:
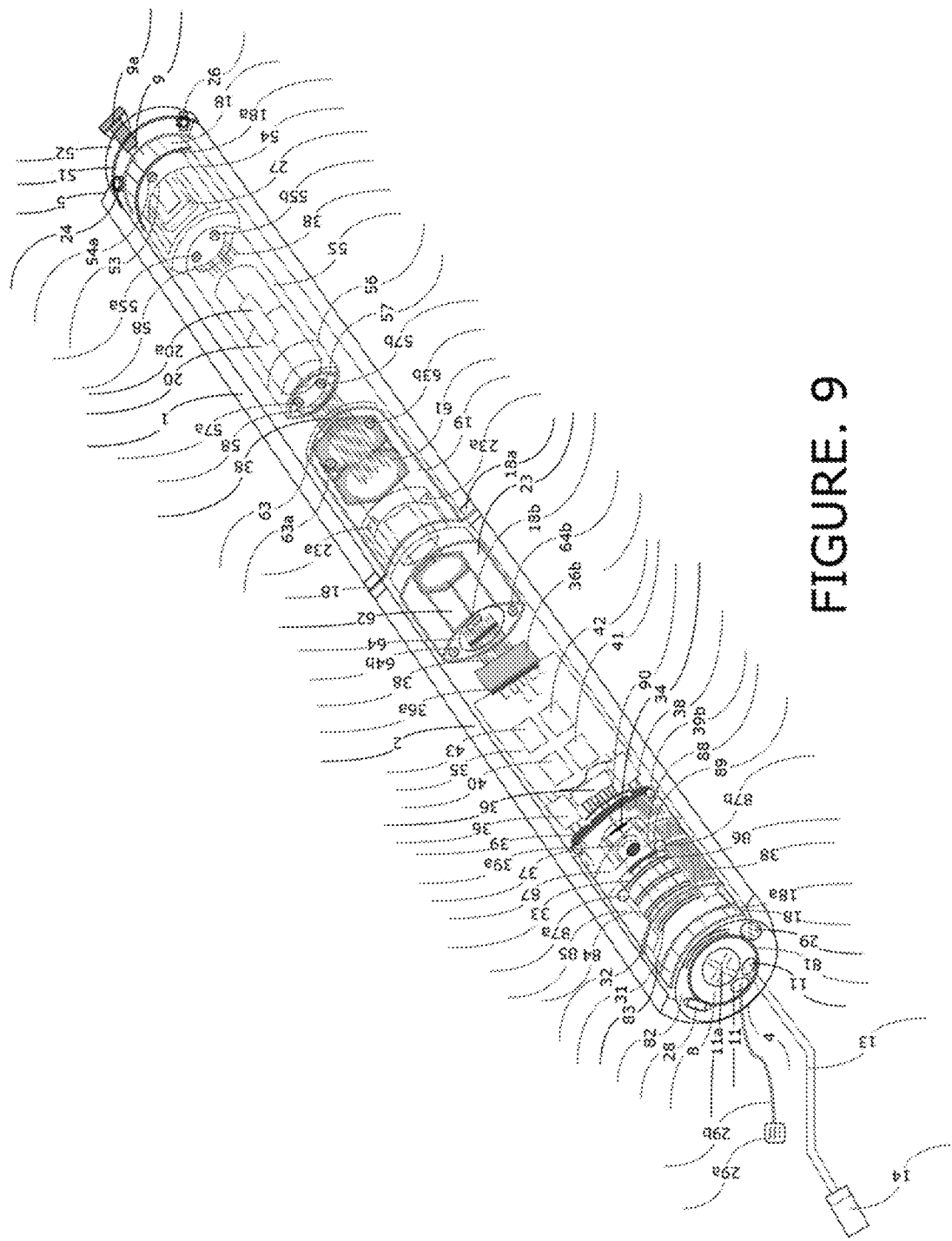

FIG. 9 depicts an isometric internal view of the short version programmable and removable auto window shade assembly showing the internal components and components layout.

Figure 10:
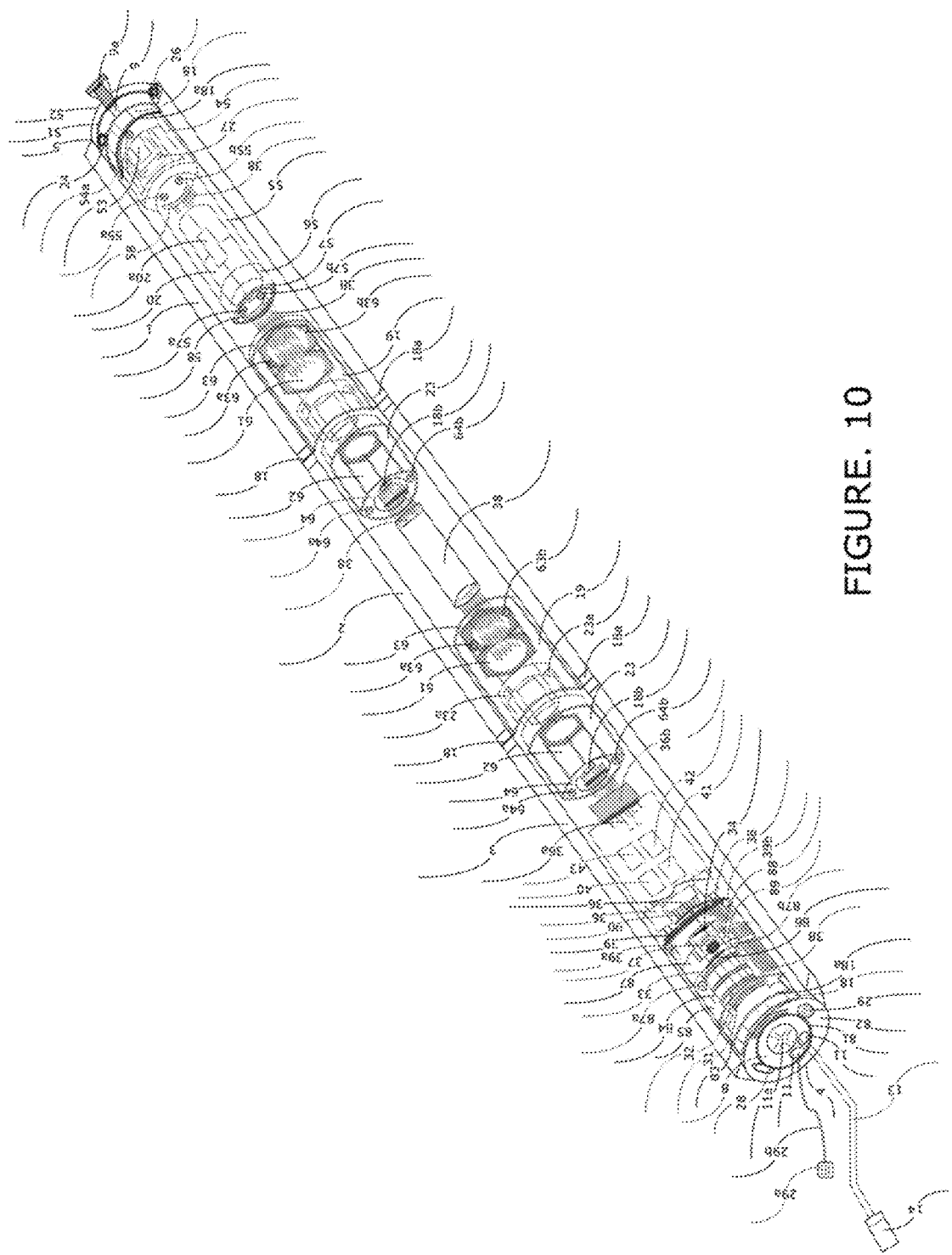

FIG. 10 depicts an isometric internal view of the longer version programmable and removable auto window shade assembly showing the internal components and components layout.

Figure 11:
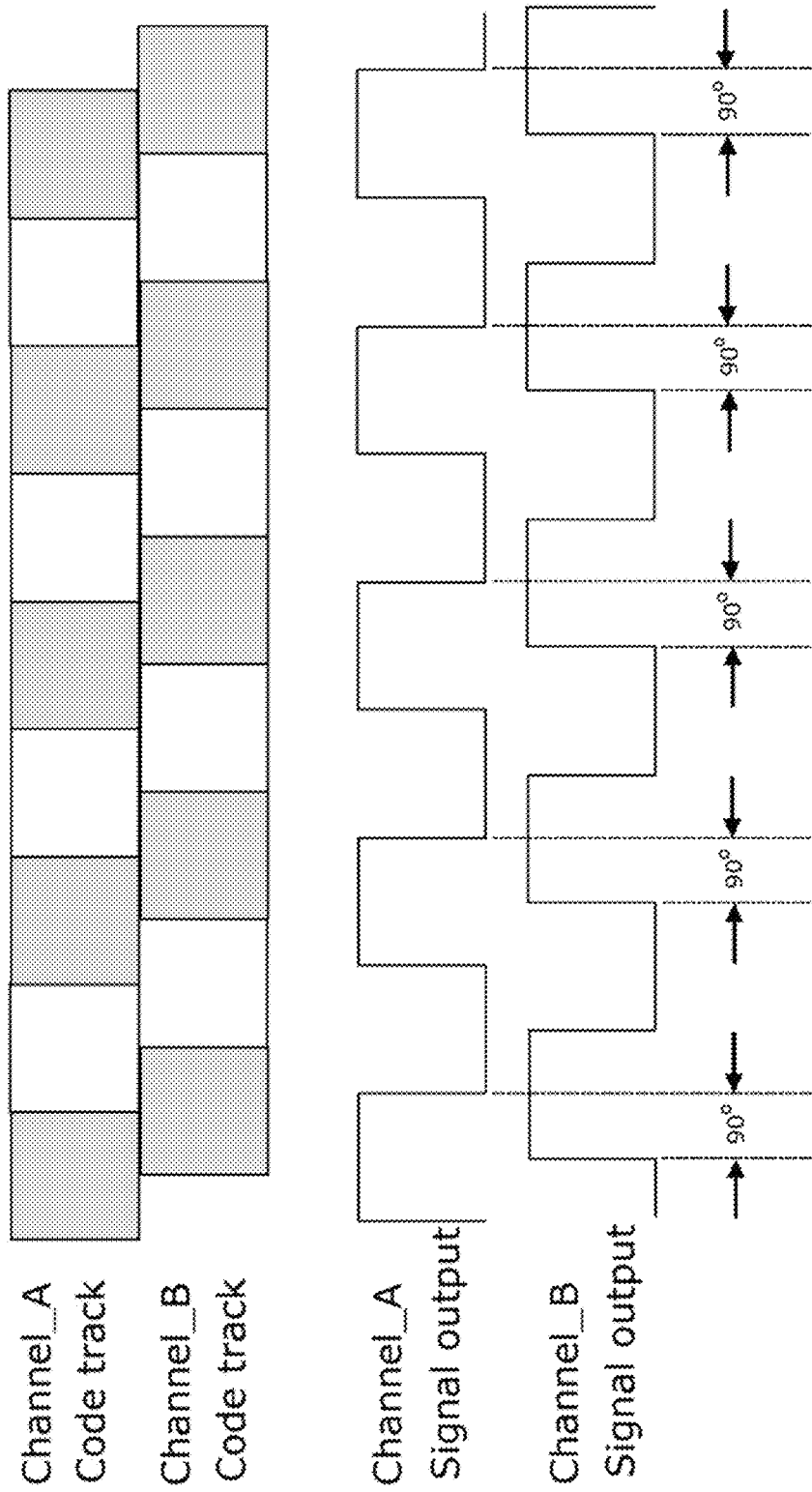

FIG. 11 depicts the fundamentals of a quadrature incremental encoder using two code tracks channels A and B with sectors positioned 90 degrees out of phase. The two output channels indicating both position and direction of rotation.

Figure 12:
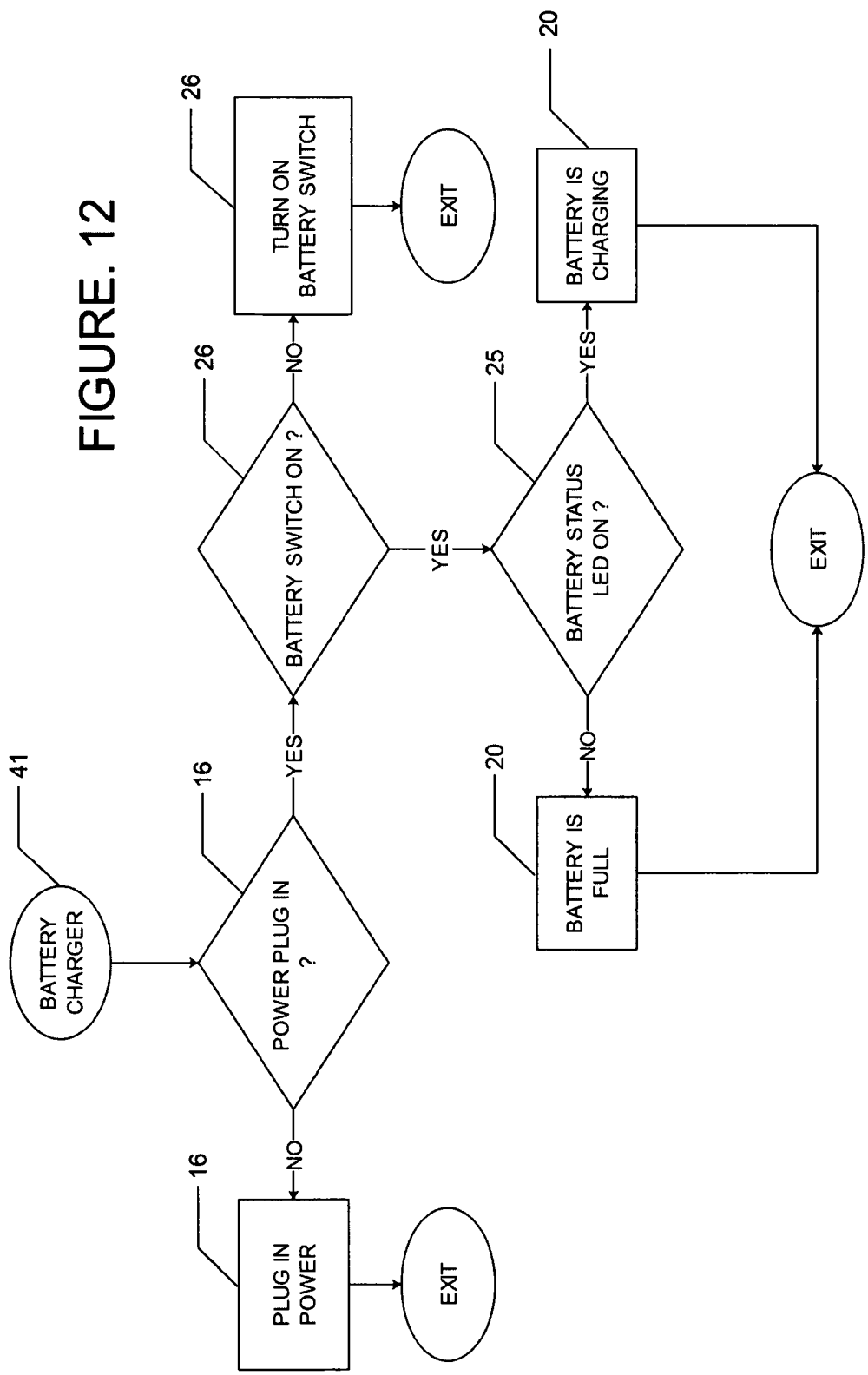

FIG. 12 depicts a function flowchart of the power and charger circuit within the programmable and removable auto window shade assembly depicts in FIG. 9 and FIG. 10.

Figure 13:
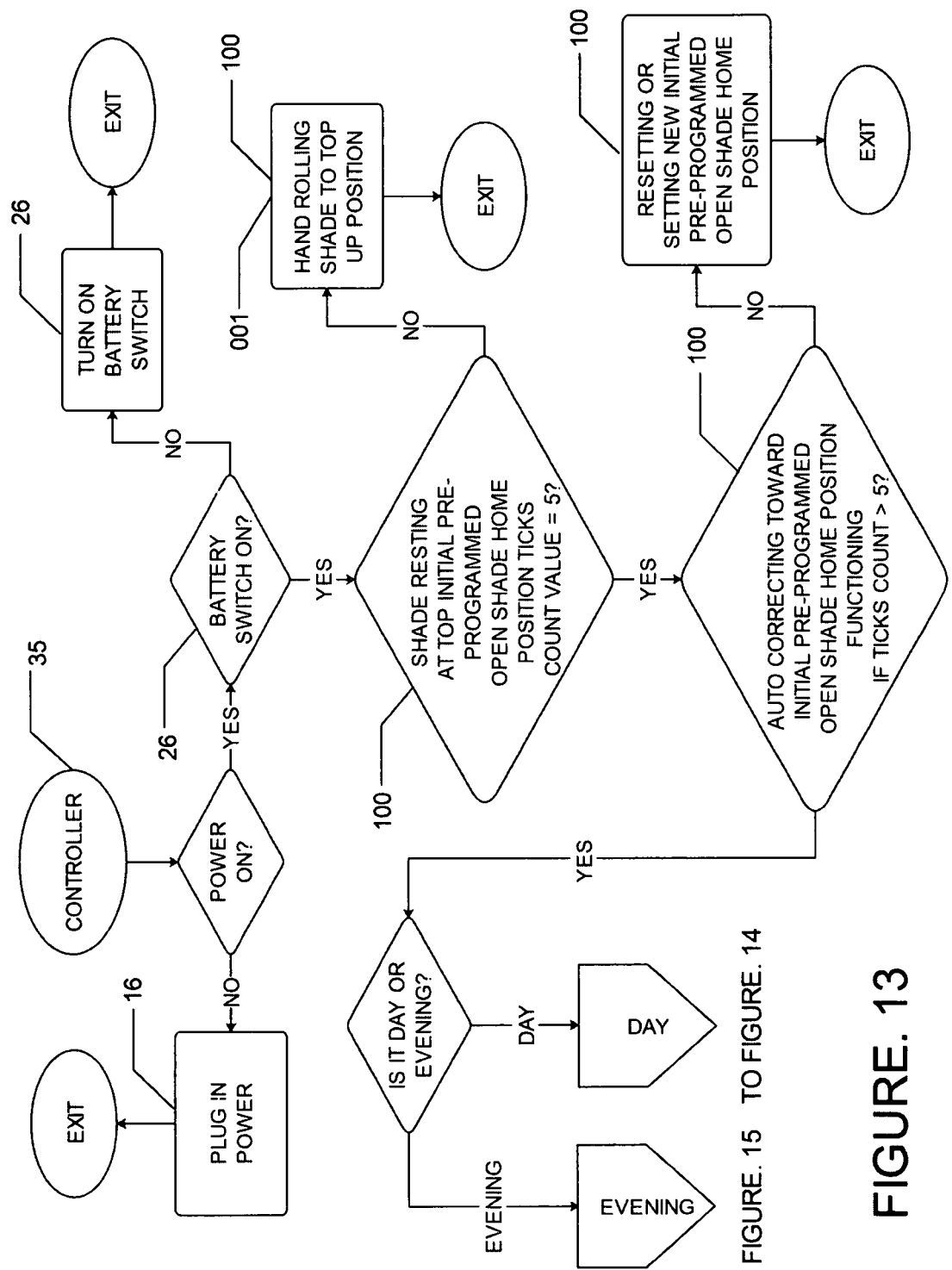

FIG. 13 depicts a function flowchart of the controller circuit within the programmable and removable auto window shade assembly depicts in FIG. 9 and FIG. 10.

Figure 14:
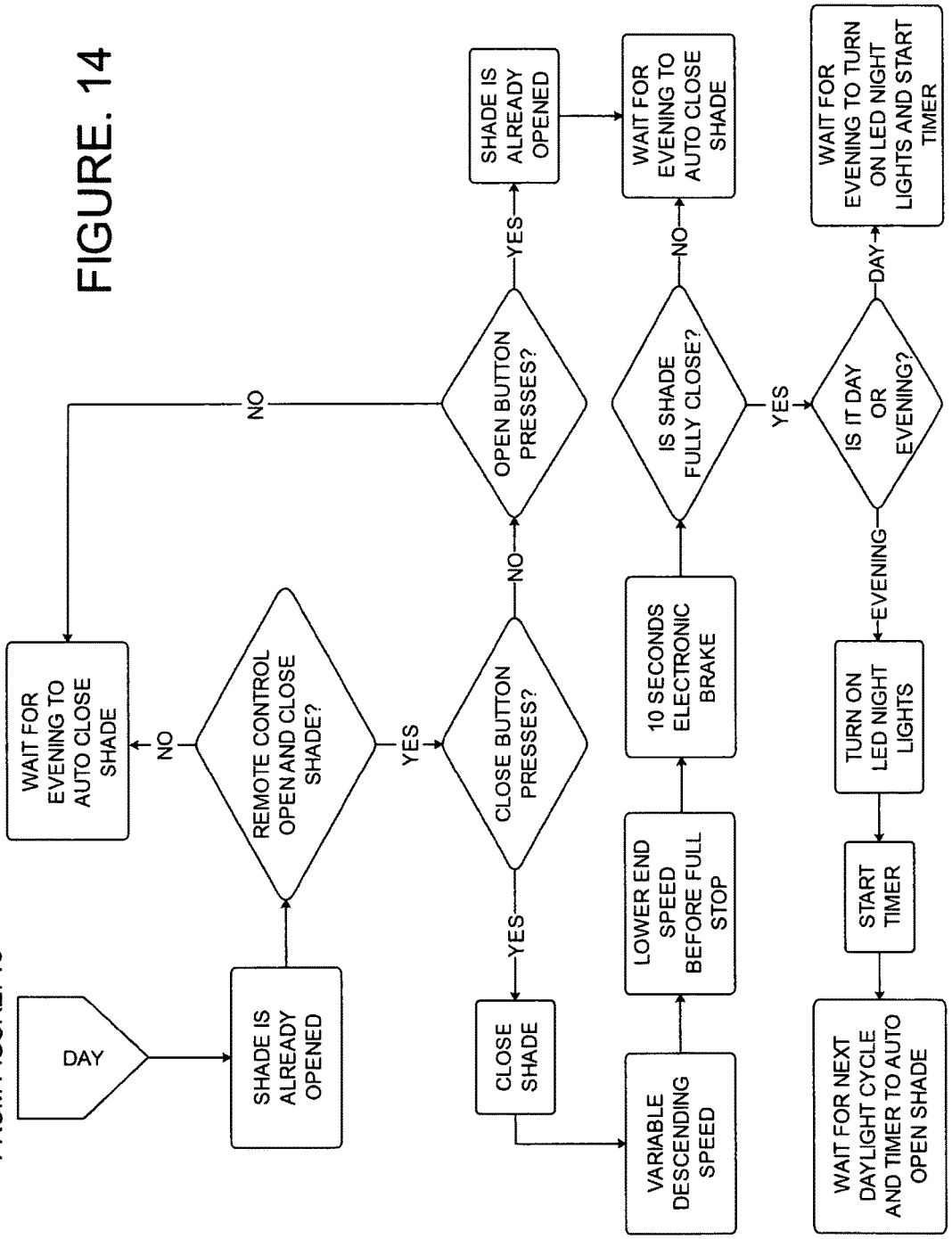

FIG. 14 depicts a second function flowchart of the controller circuit within the programmable and removable auto window shade assembly depicts in FIG. 9 and FIG. 10.

FIG. 15 depicts a third function flowchart of the controller circuit within the programmable and removable auto window shade assembly depicts in FIG. 9 and FIG. 10.

Figure 16A:
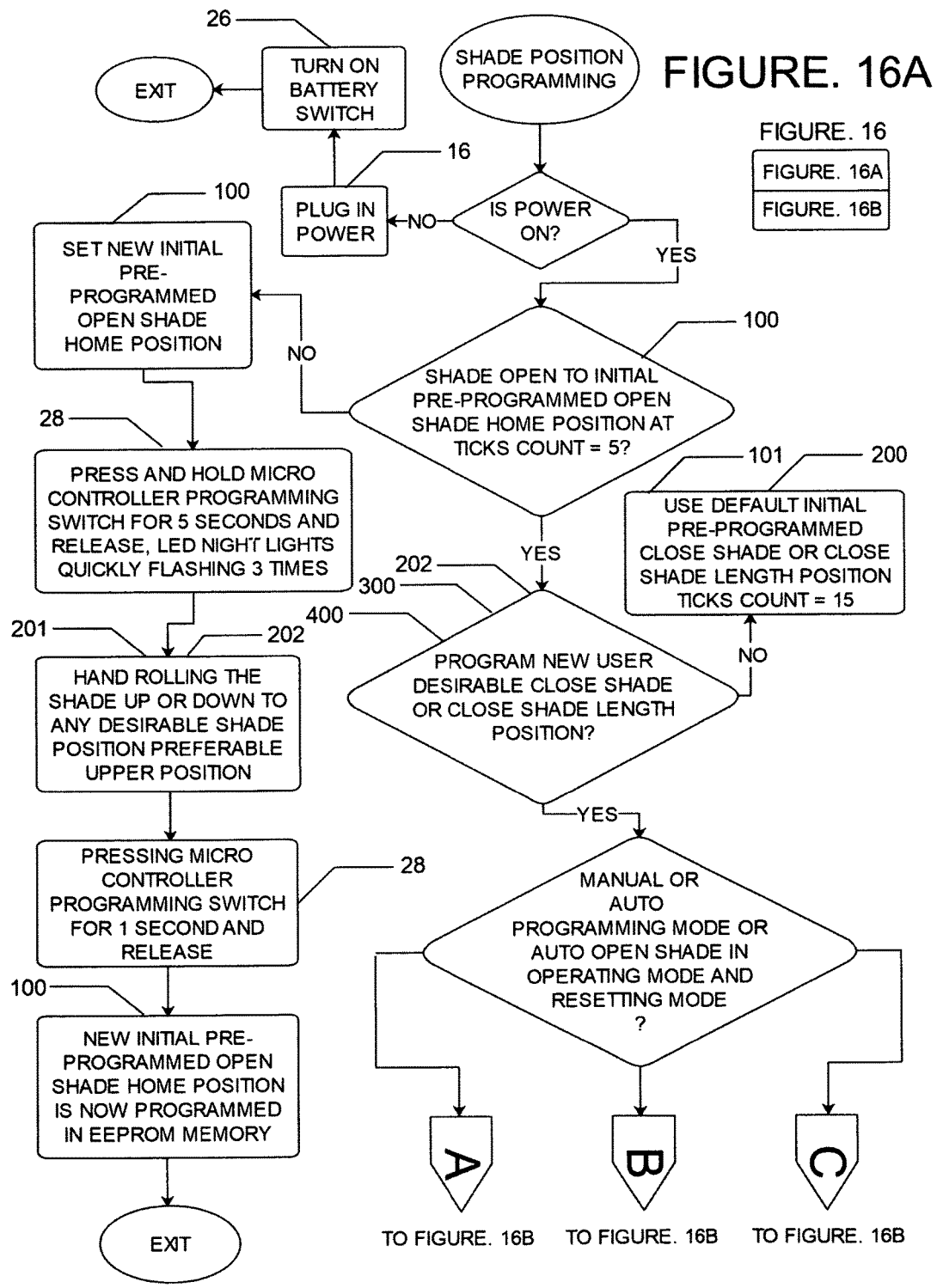

FIG. 16 depicts a shade position programming function flowchart of the controller circuit within the programmable and removable auto window shade assembly depicts in FIG. 9 and FIG. 10.

Figure 17:
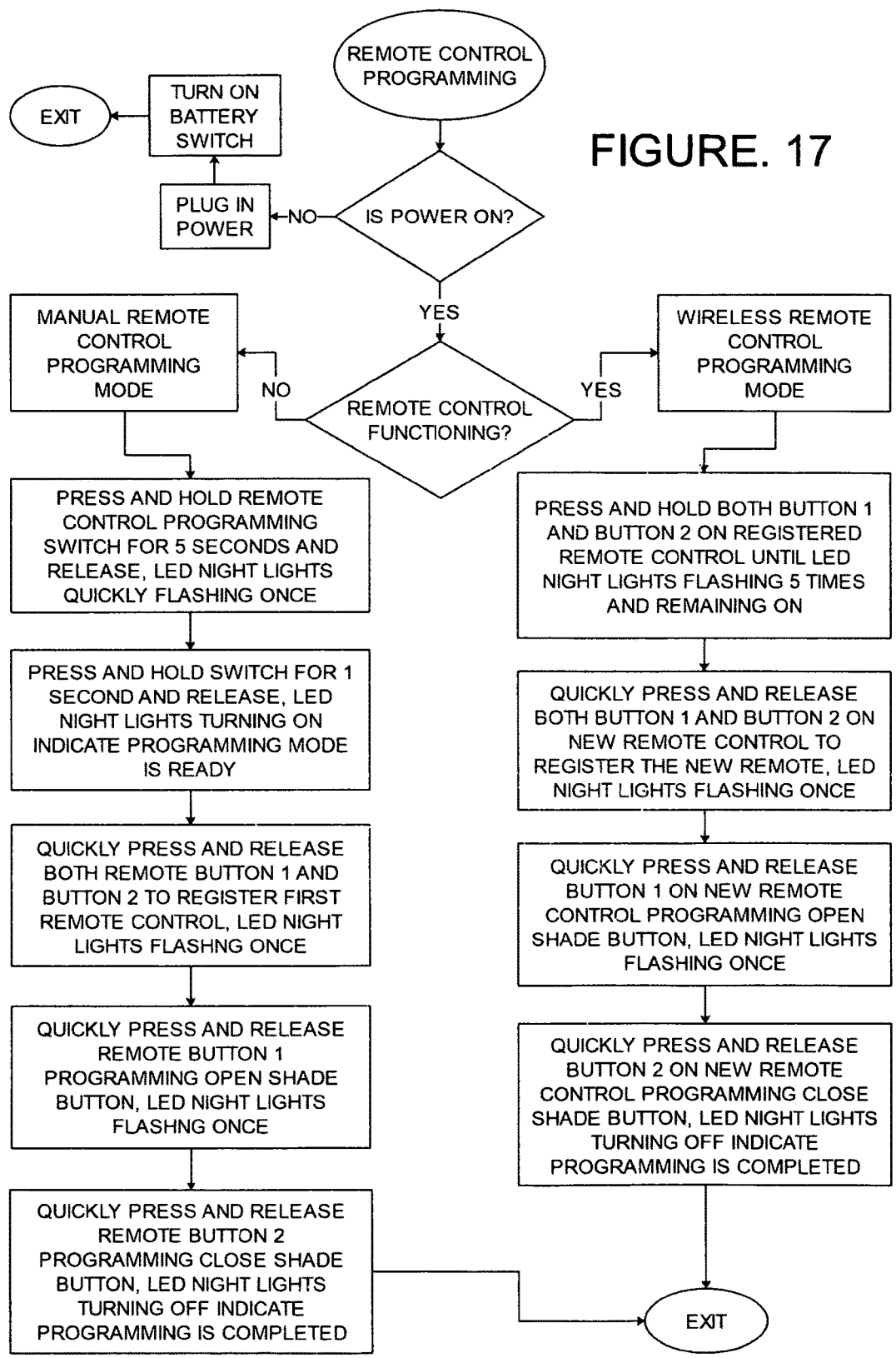

FIG. 17 depicts a remote controls programming function flowchart of the programmable wireless receiver within the programmable and removable auto window shade assembly depicts in FIG. 9 and FIG. 10.

DETAILED DESCRIPTION OF THE INVENTION

The following detailed descriptions illustrate the present invention depicts in the drawings as well as describing in details the locations, features and functionalities.

FIG. 1 and FIG. 1-A depicts a complete exploded view of both shorter and longer version programmable and removable auto window shade with color LED night lights showing the number of removable components comprising a removable color shade fabric 10, optional removable/foldable multi sectional decorative bar 10a, left bracket 7, coned shaped motor shaft end adapter 9a, removable tubular tube 1, removable tubular tube 2, removable tubular tube 3, right bracket 6 with a flat rectangular shaped pin 12 and fasteners 12a 12b 12c 12d 12e, second unit add-on cable 13a, 5V USB power cable 13b and 5V power adapter 16. The advantage of having many removal parts is the purpose of portability and simplicity.

Figure 2:
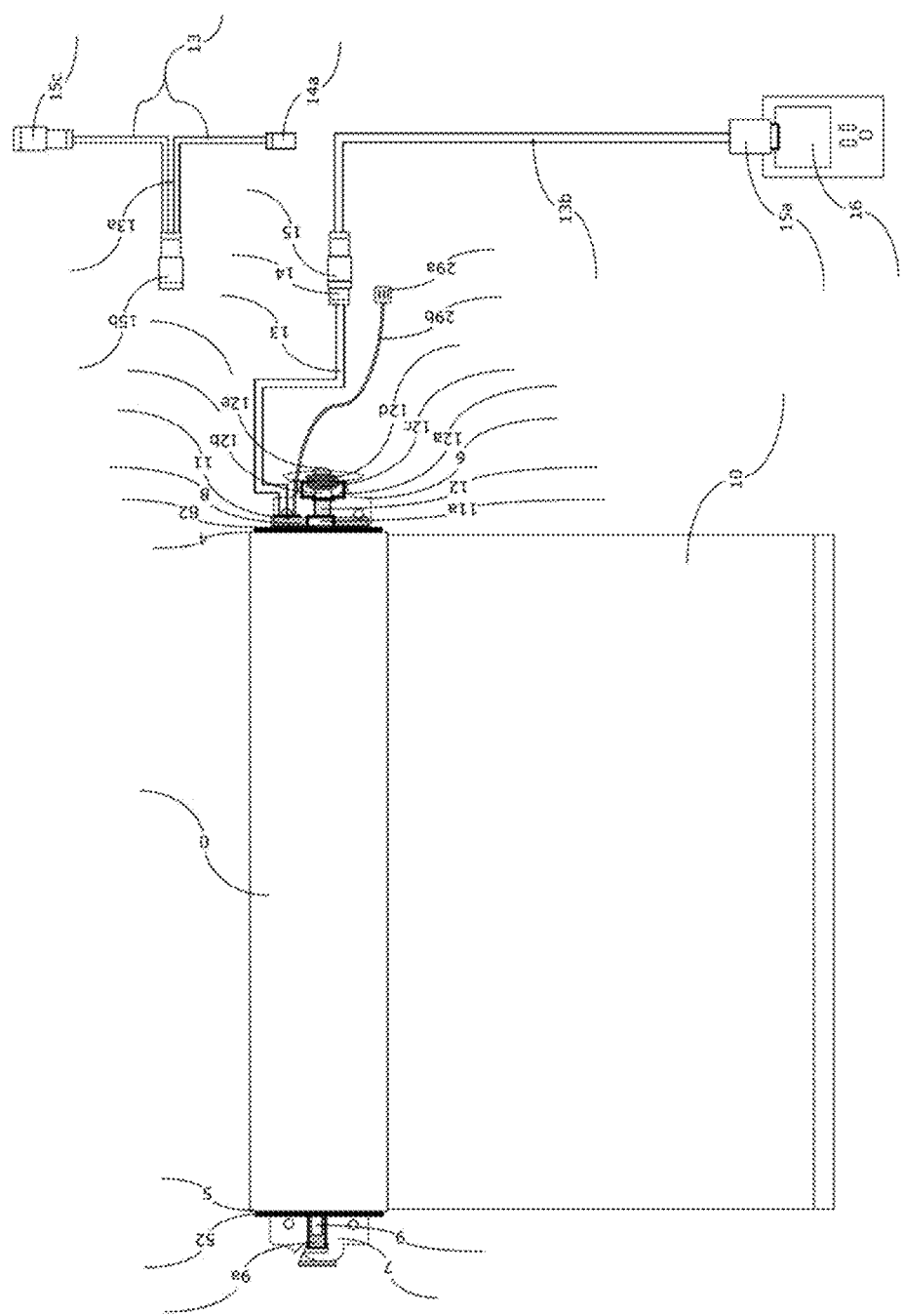
FIG. 2 depicts a complete isometric front view showing a complete assembly directly connected to the main power supply extension cable. The main power extension cable is connected to the USB power adapter.

Referring to FIG. 2 is a complete assembly of the programmable and removable auto window shade with removable color shade fabric 10 attached to the surface of tubular tube 0. The removable color shade fabric 10 with mounting pads 17a and 17b is shown in FIG. 6 and FIG. 6-A. From the characteristics design perspective, a long tubular tube 0, wherein the right end is coupled to the slip ring assembly 4, the slip ring shaft 8 is attached onto the right bracket 6.

Within the slip ring shaft 8, wires 13 are routed through one of the shaft cavity 11. The second shaft cavity 11 is used for mounting an optional external photoresistor sensor 29a. The center of the slip ring shaft 8 end having a "+" shaped cavity 11a, shown in FIG. 5, FIG. 9 and FIG. 10 is held onto the bracket 6 using a flat rectangular shaped pin 12, shown in FIG. 1 and FIG. 1A. The flat rectangular shaped pin 12 is fabricated, crimped and attached to the bracket 6 using a small piece of metal tubing, a plastic cap 12a, fasteners 12b 12c 12d and screw 12e.

Two power supply input wires 13 extending outside one of the slip ring shaft cavity 11 are connected to the 2-wire female JST connector 14 using double crimped female pins. The 2-wire female JST connector 14 is connected to the other 2-wire JST male connector 15 of the main power supply extension cable 13b using double crimped male pins, creating a quick connect/disconnect junction to the main power supply input adapter 16 through a USB Type A connector 15a. FIG. 2 further depicts the left end of the tubular tube 0, wherein the motor assembly 5 is coupled inside the tubular tube end. The motor assembly 5 comprising a 12V, 60 to 200 RPM DC geared motor 27, wherein the motor shaft 9 is fixed onto the bracket 7 using a cone shaped end adapter 9a.

Turning to FIG. 2-A, notice the quick connect/disconnect junction between connectors 14, 15b and connectors 14a, 15 providing a path to an optional second unit add-on power cable 13a for connecting to a second programmable and removable auto window shade through a 2-wire JST male connector 15c. The second unit add-on power cable 13a is convenience in a location, wherein the second unit mounting location does not have the power outlet.

FIG. 3, FIG. 3-A, FIG. 3-B and FIG. 3-C depicts the programmable and removable auto window shade with color LED night lights in three different programming positions.

FIG. 3 depicts the initial open shade home position 100 wherein the initial open shade home position 100 is pre-programmed inside the micro controller 35 a tick count value of 5. The ticks count value 5 is greater than the original top reference point 000, a tick count value 0. The initial pre-programmed open shade home position 100 can be programmed to any new initial pre-programmed open shade home position 100 using a micro controller programming switch 28. To manually program new user desirable close shade position 202 or new user desirable close shade length position 300 400 from initial pre-programmed open shade home position 100, pulling the shade 201 to any position 202 then pressing micro controller programming switch 28 for one second. Otherwise, waiting 10 seconds for the micro controller 35 registering new user desirable close shade position 202 as user programmed close shade length position 300 400 by writing the current ticks count value into EEPROM memory.

Referring to FIG. 3-A, the initial pre-programmed close shade position 101 or close shade length position 200 is intentionally pre-programmed the ticks count value of 15. Moving the shade from the initial pre-programmed open shade home position 100, ticks count value 5 to the initial pre-programmed close shade position 101 200, ticks count value 15 generally covering approximately 2 feet window length or half a common 4 feet window length. Although, the intentional initial pre-programmed close shade position 101 200 can be changed to any desired value.

In this case, the ticks count value of 15 is a default initial pre-programmed close shade position 101. Of course, setting different number of ticks count value other than the initial pre-programmed close shade position 101 or close shade length position 200 resulting in different initial pre-programmed close shade position 101 200. In addition to manual programming, the initial pre-programmed close shade position 101 200 can automatically be programmed as a new user desirable close shade position 202 or new user desirable close shade length position 300 400. Programming a new user desirable close shade position 202 by moving the shade 201 to any position 202 registering new user desirable close shade position 202 or close shade length position 300 400 after 10 seconds as shown in FIG. 3-B and FIG. 3-C. For example, during daylight hour, when the photoresistor 29 29a senses the overwhelming light level, the microcontroller commanding the programmable and removable auto window shade staying open at initial pre-programmed open shade home position 100. As the sun goes down, the photoresistor 29 29a senses the low light level commanding the programmable and removable auto window shade moving to the initial pre-programmed close shade position 101 or close shade length position 200 as shown in FIG. 3-A. Depending on the length of the physical window, the window shade 10 may not fully cover the whole physical window area.

At this point, adjusting the current initial pre-programmed close shade position 101 or close shade length position 200 to any position 202 by pulling down the shade 201 triggering programming mode, color LED night lights 18 quickly flashing 3 times and turning off registering the new user desirable close shade position 202 or close shade length position 300 after 10 seconds as shown in FIG. 3-B. To program another new user desirable close shade position 202 or close shade length position 400, pulling down the shade 201 triggering programming mode, color LED night lights 18 quickly flashing 3 times and turning off registering the new user desirable close shade position 202 or close shade length 400 after 10 seconds as shown in FIG. 3-C.

FIG. 4 depicts a detail partial view of the left end tubular tube 0. The motor assembly 5 is coupled to the left end of the half tubular tube 1 using high strength adhesive or screw 1a as shown in FIG. 6. The output shaft 9 of the DC geared motor 27 is fixed onto the left mounting bracket 7 using a cone shaped end adapter 9a. These mounting design and arrangement allows the tubular tube 0 to move in either direction about its axis. As a result, the motor shaft 9 being fixed to the left mounting bracket 7 causing the tubular tube 0 to rotate when the motor is energized. The outer ring of the motor housing 53 comprising a remote control programming switch 24 located at seven o'clock. The remote control programming switch 24 allowing multiple remote controls programming or lost/broken remote controls replacement. Located at three o'clock is a battery status LED 25. The battery status LED 25 indicating if the batteries 20 are charging. Located at eleven o'clock is a battery on off switch 26 which enabling or disabling batteries power and charging. The metal outer ring 5 having three openings 44 45 46 serves as decorative element and securing the battery LED and switches. The metal outer ring 52 is attached to the motor 27 using a mounting fastener 51 and screws 27a and 27b. Additional details of the motor assembly are shown in FIG. 4-A.

FIG. 5 depicts a detail partial view of the right end tubular tube 0. The slip ring assembly 4 is coupled to the right end of the half tubular tube 2 using high strength adhesive or screw 2b as shown in FIG. 6. Notice the longer version of the programmable and removable auto window shade as shown in FIG. 6-A, the slip ring assembly 4 is coupled to the right end of the half tubular tube 3 using high strength adhesive or screw 3b. The slip ring shaft 8 comprising a center groove 11a resembles a plus sign "+" or four way traffic. The design of the "+" shaped groove 11a allowing an easy mounting onto the flat rectangular shaped pin 12 of the bracket 6 in multiple positions. The slip ring shaft 8 further comprising two 3 mm cavities 11. One of the cavities 11 wherein the power supply wires 13 are routed toward the internal bearings 31 of the slip ring assembly 4. The second 3 mm cavity 11 is connected to an external photoresistor 29a using solid wires 29b.

Alternately, a combination of stranded wires and a short piece of steel wire may be used in place of the solid wires 29b. The benefit of using solid wires 29b allow external photoresistor sensor 29a to be bended in any direction. Thus, controlling the amount of light level detects by the photoresistor 29a. The benefit of using external photoresistor 29a over internal photoresistor 29 is the ability to adjust the automatic shade open and close functionality. For example, if a user desires to have the shade consistently open or close at any period of time, the user simply adjusts the external photoresistor sensor 29a toward the window for detecting higher light level or away from the window for detecting lower light level. When the external photoresistor 29a receiving the right amount of light, the micro controller 35 processing the commands to open or close the shade 10. Other useful feature may come in handy is the automatic light level programming using a remote control, blue tooth or wifi in case the user mounting the motorized unit higher than normal. User may have a choice adjusting the light level either manually, wirelessly or both.

The outer ring of the slip ring housing 83 comprising a micro controller programming switch 28 located at twelfth o'clock for manually adjustment of shade positions. Located at six o'clock is an internal photoresistor sensor 29 for automatic open and close of the window shade 10. The metal outer ring 82 having openings 48 49 also serves as decorative element and securing the programming switch 28 and internal photoresistor 29. The metal outer ring 82 is coupled to the slip ring bearing housing 81, wherein the slip ring shaft 8 is attached. Additional details of the slip ring assembly are shown in FIG. 5-A.

FIG. 6 is similar to FIG. 2-A with the shade fabric 10 removed. The surface of the tubular tube 1 and tubular tube 2 having removable shade mounting pads 17a. Notice the removable shade fabric 10 also having multiple mounting pads 17b. The tubular tube 1 and tubular tube 2 having a quick connect/disconnect female coupling 19 and male coupling 23, which joined the two tubular tubes 1 2. The surface of the male coupling 23 having a set of color LED night lights 18 and LED night lights cover 18a. Screw 1a 1b 2a 2b may be used to secure the motor assembly 5, female coupling 19, male coupling 23 and slip ring assembly 4.

FIG. 6-A is the longer version of FIG. 6 with the shade fabric 10 removed from the tubular tube 0. The longer version having three tubular tubes 1 2 3 and an additional number of removable shade mounting pads 17a. The removable color shade fabric 10 also having additional matching mounting pads 17b and the joined sections between the three halves tubular tubes 1 2 3 having two sets of female couplings 19 and male couplings 23. The surface of the two male couplings 23 having two sets of color LED night lights 18 and LED night light covers 18a.

Referring to FIG. 7, shown the separation of the two halves tubular tubes 1 2 exposing right half tubular tube 2 and left half tubular tube 1. The right half tubular tube 1 having a left open end, wherein the right end of the male coupling 23 is coupled using a single screw 2a. The left open end of the male coupling 23 having two unequal sized male tab inserts 23a providing an interlocking to coupling 19a. The left half tubular tube 1 having a right open end, wherein the left end of the female coupling 19 is coupled using a single screw 1b. On the other hand, the right open end of the female coupling 19 having two unequal sized female notches 19a and locking notches 22.

The horizontal direction arrow 500 and the curved arrow 600 depicts how the two tubular tubes 1 2 are quickly joined together. Tubular tube 2 is joined to tubular tube 1 by aligning the two unequal sized male tab inserts 23a into the two female notches 19a then locking the two tubular tubes 1 2 by turning the tubular tube 2 90 degrees in clockwise position 600 through the locking notches 22. Finally, push the tubular tube 2 to the left direction 500 toward tubular tube 1 connecting the 8-pin DIN male connector 62 to the 8-pin DIN female connector 61 and further locking tubular tube 1 and tubular tube 2 inside locking notches 22. The unequal sized female notches 19a and male tab inserts 23a interlocking the female coupling 19 and male coupling 23 so that tubular tube 1 and tubular tube 2 is held together without using screws. The interlocking of the tubular tube 1 and tubular tube 2 is not limited to 90 degrees. The interlocking can be modified to accommodate anywhere between 0 to 360 degrees. Detailed view of the locking notches 22 are shown in FIG. 8-A.

FIG. 7-A is the longer version of FIG. 7 depicts in details the separation of the three halves tubular tubes 1 2 3 exposing right half tubular tube 3, middle half tubular tube 2 and left half tubular tube 1. The longer version having additional third halves tubular tube 3 and additional set of male and female couplings 23 19, shade fabric mounting pads 17a, 8-pin DIN male and female connectors 62 61, color LED night lights 18, LED night lights cover 18a and screw 3a.

FIG. 8 depicts a detail view of half tubular tube 1, 2 and half tubular tube 2, 3 showing a close up view of the female coupling 19 and male coupling 23. The female coupling 19 comprising two unequal sized female notches 19a, multiple locking notches 22 and female DIN connector 61. The male coupling 23 comprising two unequal sized male tab inserts 23a, male DIN connector 62, LED night lights 18 and LED night lights cover 18a. The two unequal sized male tab inserts 23a protruding slightly within the inner front diameter and extending outside the front end of the male coupling 23 as shown in FIG. 8-A. The protruding part of the two unequal sized male tab inserts 23a designed for a perfect fitting when inserting into the two female notches 19a. Turning the male coupling 23 90 degrees in clockwise creating an interlocking between the two couplings 19 23 then pushing the male coupling 23 into the locking notches 22 connecting the two male and female connectors 62 61, thus creating a stronger final locking.

From the order left to right, FIG. 9 depicts the slip ring assembly 4, position encoder 39, controller Printed Circuit Board (PCB) 35, tubular tubes 2 male coupling 23, tubular tube 1 female coupling 19, lithium batteries 20, battery protection 20a and motor assembly 5. The slip ring assembly 4 comprising a metal outer ring 82, slip ring bearing housing 81, slip ring housing 83, slip ring shaft 8, color LED night lights 18 and LED night lights cover 18a, slip ring bearings 31, slip ring bearing cover 84, slip ring cover 85, slip ring cover fastener 86, position encoder mounting bracket 87, position encoder mounting bracket screws 87a and 87b, magnetic wheel mounting pin 37, magnetic wheel mounting pin fastener 88 and fastener cover 89, position encoder magnetic wheel 90 and slip ring assembly connectors 36.

The outer ring of the slip ring housing 83 depicts in FIG. 5 and FIG. 5-A, comprising a micro controller programming switch 28 and internal photoresistor 29, wherein the wires 38 of the micro controller programming switch 28 and photoresistor 29 are connected to the slip ring assembly connectors 36. The metal outer ring 82 is coupled to the slip ring shaft 8 through the slip ring bearing housing 81 and slip ring bearings 31. The outer surface of the slip ring shaft 8 comprising two 3 mm cavities 11 providing power supply input 13 and optional external photoresistor sensor 29a, wherein the wires 29b are routed through the second cavity 11 and connecting to the inner slip ring shaft bearings 32. The power supply input 13 within the outer shaft 8 is routed through the first cavity 11, wherein the wires 13 extending through a rectangular slot 8a and connecting to the inner slip ring bearing 32. The outer surface of the slip ring housing 83 is coupled with a set of color LED night lights 18, wherein the surface of the color LED night lights 18 is secured with a LED night lights cover 18a. Two wires 38 are soldered onto the color LED night lights 18 and connecting to the slip ring assembly connectors 36. Other wires 38 are connected to the outer slip ring bearing 33, routing through the slip ring cover 85, encoder mounting bracket 87 and connecting to the slip ring assembly connectors 36.

The slip ring cover 85 is attached to the slip ring shaft 8 through the back opening. The slip ring cover 85 having male tab inserts 85a are attached and seated securely inside the females notches 83a of slip ring housing 83 as shown in FIG. 5-A. The slip ring cover 85 is fastened to one of the slip ring locking groove 8b using fastener 86 and the back end of the slip ring cover 85 comprising two mounting cavities, wherein the encoder mounting bracket 87 is attached with screws 87a and 87b. The inner end of the slip ring shaft 8 having a cavity 34 and a mounting groove 8c, wherein the encoder magnetic wheel pin 37 is coupled and secured with fastener 88 and fastener cover 89. The encoder mounting bracket 87 comprising two 12 mm long poles, wherein the position encoder 39 is attached using screws 39a 39b and the Printed Circuit Board of the position encoder 39 is fitted with three wire connectors 36 for directly connecting to the main circuit board 35.

The mid section between the tubular tube 1 and tubular tube 2 is joined by a female coupling 19 and male coupling 23, wherein a set of LED night lights 18 and cover 18a is mounted. One end of the female coupling 19 and male coupling 23 is coupled to tubular tube 1 and tubular tube 2 using high strength glue or screws 1b 2a as shown in FIG. 7 and FIG. 7-A. The internal of the female coupling 19 and male coupling 23 having a hex diameter coupled to the 8 pin DIN female connector 61 and 8 pin DIN male connector 62. Both male and female DIN connectors 62 and 61 are secured to the couplings 19 and 23 using fasteners 63 64 and screws 63a 63b 64a 64b.

The back end of the female DIN connector 61 having multiple wires 38 which are connected to the wire connector 36b, wherein the wire connector 36b is connected to the main Printed Circuit Board connector 36a. Similarly, the back end of the male DIN connector 62 also having multiples wires 38. The wires 38 are routed through the opening 58 of the battery lid 56 and battery housing tube 55. Batteries 20 and battery protection circuit 20a are mounted within the battery housing tube 55, wherein the batteries wires and motor assembly wires 38 are routed through the opening 58 of the motor housing cover 54. The motor assembly wires 38 are the wires that connecting to the motor 27, remote control programming switch 24, battery indicator LED 25, battery on off switch 26 and LED night lights 18.

The back end of the battery tube 55 and motor housing cover 54 is joined together using screws 55a and 55b before completely attached to the motor housing 53, wherein the motor 27 is securely fastened using screw 54a. Within the surface of the motor housing 53, a set of LED night lights 18 and a LED night lights cover 18a is mounted. The outer ring of the motor housing 53, wherein the 2-wire charging status LED 25 indicates the status of the batteries and the 2-wire remote control programming switch 24 allows the wireless receiver 44 programming up to six remote controls. Thus, allowing a single twelfth buttons remote control operating up to six programmable and removable auto window shades. The 2-wire batteries switch 26 allowing the controlling of batteries 20.

FIG. 10 depicts a longer version having three halves tubular tubes 1 2 3, two sets of female couplings 19, two sets of male couplings 23, two sets of color LED night lights 18 and LED night lights covers 18a, two sets of male and female DIN connectors 61 62, two sets of DIN connector fasteners 63 64, two sets of screws 63a 6b 64a 64b and four screws 1b, 2a, 2b, 3a. Notice the internal of tubular tube 2 having a long wire bundle 38 with flexible sleeve.

The following describes the functionalities of the present invention. The flow charts FIGS. 12, 13, 14, 15, 16 and 17 are described in the following as reference to the functions of FIG. 3, FIG. 3-A, FIG. 3-B, FIG. 3-C, FIG. 9 and FIG. 10.

Referring to FIG. 12, when 5V power supply 16 is plugged into the wall and the battery switch 26 is turned on, power is transmitted to the controller Printed Circuit Board 35. The DC converter circuit 40 within the controller board 35 output between 9V-15V, thus charging the batteries 20 depending on the number of battery cells. For example, to charge two cells 8.4V batteries, the DC converter 40 output 9V commanding the charger 41 to charge the batteries 20 and monitors the charging current and voltage. While charging, the charging status LED 25 on the outer ring of the motor housing 53 turning on indicating the charging process. If power is loss due to electrical outage, the DC converter 40 switching to battery mode providing power to operate the main controller 35 and other electronic components. As power is recovered, the DC converter 40 switching to charging mode, monitoring the batteries 20 and repeating the charging process until the battery status LED 25 turning off, indicating batteries 20 receiving a full charge and stop charging. The controller 35 continues operating from the wall power adapter 16 thus, reserving batteries 20 for backup. In case the charger 41 circuit malfunctions, the charger 41 shut down and the battery protection circuit 20a disconnects the batteries 20 power while the controller 35 continues operating from the wall power adapter 16.

In FIG. 13, the controller 35 detects power for the first time, the charger 41 monitors and charges the batteries 20. The controller read the encoder position 39 to determine the current shade position 202. At the same time, the photoresistor 29 29a senses the light level to determine whether it is day or evening to open and close the shade 10. The light level ranging from zero to eight hundreds whereas zero is the darkest level and eight hundreds is the brightest level. The controller 35 is programmed to respond from dawn to dusk meaning the light level reading above two hundreds is day and below two hundreds is evening. Assuming user has mounted the programmable window shade unit with the shade fabric 10 locating at the top position. If not, make sure the shade 10 is resting at top up initial pre-programmed open shade home position 100 by hand rolling the shade 10 to the top up position 001 100 as shown in FIG. 3. When the photoresistor 29 29a senses daylight, the controller 35 read the current ticks count value and comparing to the initial pre-determined open shade home position 100 which is pre-programmed the ticks count value 5. If the reading of the current ticks count is greater than 5, the controller 35 performs an auto home position correcting functionality by automatically moving the shade 10 toward the top up position until stopping at the initial pre-programmed open shade home position 100.

If auto home position correcting functionality performs successfully, the system is ready and proceeding to normal operating by detecting the light level from the photoresistor 29 29a or waiting for remote control, bluetooth or wifi command in order to carry out an appropriate function. If auto home position correcting fails, resetting or re-programming the initial pre-programmed open shade home position 100 is required for the system to function properly by pressing and releasing the micro controller programming switch 28 once. Alternately, user can reset the initial pre-programmed open shade home position 100 by pulling down the shade 201 past the close shade position 101 as shown in FIG. 3-A by 4 ticks count to enter resetting mode 4. Color LED night lights momentarily flashing 4 times and resetting is completed. After 10 seconds, the window shade 10 automatically moving to the initial pre-programmed open shade home position 100.

After initial pre-programmed open shade home position 100 is set, the controller 35 read the photoresistor sensor 29 29a input detecting whether it's day or evening. At any given time period the position the user setting or resetting the initial pre-programmed open shade home position 100, that time period is either day or evening. If the photoresistor 29 29a senses the brightest light level at initial pre-programmed open shade home position 100, the controller 35 does not activates the motor driver 42 which controls the DC gear motor 27 because the controller 35 understood that the shade 10 is already open at home position 100 and waiting until the evening cycle to auto close window shade 10.

Referring to FIGS. 14, 15 and 16, when daylight is detected, the shade 10 is open at initial pre-programmed open shade home position 100, ticks count value 5. During daylight hour, there may be an excessive amount of sunlight passing through the window. User can limit the amount of sunlight by manually close or open the shade using remote control, blue tooth or wifi. Note, bluetooth and wifi are upgradeable options for tech savvy users. Otherwise, user can choose to have the shade 10 remains open at initial pre-programmed open shade home position 100 and programming new user desirable close shade position 202 or close shade length position 300 400. Alternately, user can program new user desirable close shade position 202 or close shade length position 300 400 after closing the shade to the initial pre-programmed close shade position 101 or close shade length position 200.

To automatically program new user desirable close shade position 202 or close shade length position 300 400 from the initial pre-programmed open shade home position 100 as shown in FIG. 3-B and FIG. 3-C. Pulling down the window shade 201 from the initial pre-programmed open shade home position 100 to any new user desirable close shade position 202 that is greater than the initial pre-programmed close shade position 101 200 by at least 5 ticks count. If the number of ticks count of the current shade position 202 is at least 5 ticks count greater than the number of ticks count value 15 of the initial pre-programmed close shade position 101 200, new user desirable close shade position 202 or close shade length 300 400 registering after 10 seconds. If the number of ticks count of the current shade position 202 is lesser than or equal to the number of ticks count value 15 of the initial pre-programmed close shade position 101 200, new user desirable close shade position 202 or close shade length position 300 400 automatically registering a default value 15 of the initial pre-programmed close shade position 101 or close shade length position value 200 after 10 seconds. Note that color LED night lights 18 quickly brighten up for a second indicating each successful programming. Resetting to a default initial pre-programmed close shade position 101 or close shade length position 200 is a feature purposely designed to allow the shade 10 to be located within user reach for re-programming new user desirable close shade position 202 or close shade length position 300 400.

As the sun goes down, the photoresistor sensor 29 29a senses the darkest level, the controller 35 delays 10 seconds before closing the shade by energizing the DC geared motor 27 through the motor driver 42 in one direction with variable descending speed until the shade nearly reaches the initial pre-programmed close shade length position 200 or user desirable close shade position 300 400. The controller 35 reducing to a lower end speed, turns on LED night lights 18, engages electronic brake 43 for 10 seconds and stops. Electronic brake 43 engages and disengages for 10 seconds before stopping to ensure the motor 27 is stopped at accurate position. The window shade 10 remains closed and activated the timer until the next coming daylight. The timer function is optional which may be used to offset the light level caused by the built-in LED night lights 18 and the surrounding light level.

As the sun goes up, the photoresistor sensor 29 29a senses the brightest light level and the timer has reaches the set limit, the controller 35 delays 10 seconds, opening the shade in reverse direction with variable descending speed, turns off LED night lights 18, reducing to lower end speed before reaching initial pre-programmed open shade home position 100, engages electronic brake 43 for 10 seconds and stops. The shade remains open at initial pre-programmed open shade home position 100 until the next evening cycle to auto close shade. When next evening cycle is detected, the photoresistor sensor 29 29a commanding the micro controller 35 to automatically close the shade 10 regardless of the current shade position 202. As soon as the shade 10 closing toward the initial pre-programmed close shade length position 200 or user desirable close shade length position 300 400. LED night lights turn on and timer activating until the next daylight cycle to auto open the shade. If the shade 10 does not cover the physical window length when fully closed, user can easily adjusts initial pre-programmed close shade length position 200 to cover any window length depending on the actual window size by pulling down the shade 201 past the initial pre-programmed close shade position 101 or close shade length position 200 to any position 202, new user desirable close shade position 300 400 registering after 10 seconds.

If user desired, user can manually open, close and stop the window shade 10 using the remote control. For example, the window shade 10 is opened at initial pre-programmed open shade home position 100, pressing the remote control button number 2 for at least 2 seconds and release commanding the controller 35 to close the window shade 10. As the window shade 10 approaching the close shade position 101 202 or close shade length position 200 300 400 in variable descending speed, pressing the remote control button number 1 for one second and release demanding the controller 35 lowering the motor end speed, engaging electronic brake 43 for 10 seconds stopping the shade at any current position between the initial pre-programmed open shade home position 100 and the close shade position 101 202. Pressing the remote control button number 2 again for at least two second closing the window shade 10 at variable lower descending speed, engaging electronic brake 43 for 10 seconds and stopping at the close shade position 101 202. LED night lights 18 does not turn on until evening is detected.

When the window shade 10 is closed at the close shade position 101 202 or at any position between the initial pre-programmed open shade home position 100 and the close shade position 101 202, pressing the remote control button number 1 for at least 2 seconds and release commanding the controller 35 to open the shade 10 and turning off color LED night lights 18. Before the window shade 10 reaching the initial pre-programmed open shade home position 100, pressing the remote control button number 2 for one second and release stopping the shade 10 at the current shade position. If pressing the remote control button number 1 again for 2 seconds, the window shade 10 would fully open to the initial pre-programmed open shade home position 100.

In the event a user desires to reset the current position 202 to the default initial pre-programmed close shade position 200, the task is simple. Either using remote control or hand rolling the window shade 10 to desirable upper position above the initial pre-programmed close shade length position 200. Pressing and releasing micro controller programming switch 28 for one second automatically registering default initial pre-programmed close shade length position 200. The second method is pulling down the shade 10 by 4 ticks count to resetting mode 4 automatically resetting and opening the window shade 10 to a default initial pre-programmed close shade position 101 200. The third method is pulling down the shade 201 past the close shade position 101 202 by at least 5 ticks count until color LED night lights 18 momentarily flashing on and off entering programming mode 5, quickly using remote control or hand rolling the shade 10 to desirable upper position automatically registering default initial pre-programmed close shade position 101 or close shade length position 200 after 10 seconds. Notice color LED night lights 18 quickly flashing 3 times and turning off indicating successful programming.

Referring to FIG. 17, user may want to open or close the window shade 10 during the day or evening, a built in programmable wireless receiver 44 within the controller 35 can be used for remote control function. A single two buttons remote control can be programmed to operate a single and removable auto window shade by using the remote control programming switch 24. Pressing and holding the remote control programming switch 24 for one second then release, color LED night lights 18 turning on indicating remote programming mode. Pressing and releasing both button number 1 and button number 2 registering remote control 1. Pressing and releasing button number 1 on remote control 1 registering button number 1 for opening the window shade 10. Pressing and releasing button number 2 on remote control 1 registering button number 2 for closing the window shade 10. If desired, user may repeat the above steps to manually register remaining remote controls 2 to 6.

Besides manual remote programming mode, user can program remote controls wirelessly by pressing and holding both button 1 and button 2 on the remote control 1 for at least 5 seconds or until color LED night lights 18 flashing 5 times and remaining on indicating remote control programming mode. Pressing and releasing both button number 1 and button 2 on remote control 2 registering remote control 2. Pressing and releasing button number 1 on remote control 2 registering button number 1 for opening the window shade 10. Pressing and releasing button number 2 on remote control 2 registering button number 2 for closing the window shade 10. Note that color LED night lights 18 flashing once for each programming steps and turning off indicating successful remote control programming. While in remote control programming mode, user has 20 seconds to program one remote control at a time before the system exiting programming mode. Any registered remote control can be used to enter remote control programming mode by pressing and releasing button number 1 and button number 2 for at least 5 seconds or until color LED night lights 18 flashing 5 times and remaining on indicating programming mode. Programming remaining remote controls by pressing and releasing button number 1 on remote control 3 registering button number 1. Pressing and releasing button number 2 on remote control 3 registering button number 2. If desired, user may repeat the above steps to wirelessly register remaining remote controls 4 to 6.

It will be appreciated by those skilled in the art that the programmable and removable automatic motorized roller shade with color LED night lights is not limited to the details of the foregoing embodiments. The present invention may be modified and embodied in other forms without departing from the spirit of the invention. For example, those skilled in the art may easily convert the present invention to an automatic projector screen by replacing the removable shade fabric with a projector screen material. In another example, the present invention comprising at least 1 set of color LED night lights mounted externally and 2 sets of color LED night lights mounted internally. Those skilled in the art may mount all sets of color LED night lights either internally or externally on different location of the tubular tubes. It should be understood that the present invention has been described in relation to particular embodiments and drawings thereof, many variations and modifications may be obvious for those skilled in the art. It is preferred, therefore, that the present invention be limited not by the specific closure herein, but only by the appended claims.

What is claimed is:

1. A programmable and removable automatic motorized roller shade with color LED night lights comprising:

a. at least two 1.25 inches or smaller diameter tubular tubes joined together with at least one set of male and female quick connect/disconnect couplings creating a single tubular tube with two open ends; the surface of said tubular tube having at least 4 shade mounting pads; one or more set of male and female quick connect/disconnect couplings that joined said tubular tubes having at least one set of external color LED night lights and covers mounted onto the surface; one end of said tubular tube wherein the motor assembly is coupled with adhesive or screw; said motor assembly comprising a metal outer ring, a metal outer ring mounting fastener, a motor housing, a set of internal color LED night lights and cover, a DC geared motor and a motor housing cover; said DC geared motor is mounted inside said motor housing with a screw; said internal color LED night lights and cover is mounted onto the surface of said motor housing; said motor housing is attached to the motor housing cover with a screw, wherein the back end of the motor housing cover having a wire slot and two screws attached to one end of a battery housing tube; said DC geared motor having a motor shaft, wherein said motor shaft having a cone-shaped end adapter attached to a mounting bracket;

b. the other end of said tubular tube, wherein a slip ring assembly is coupled with adhesive or screw; said slip ring assembly comprising a metal outer ring, a slip ring shaft bearing housing, a slip ring shaft, a slip ring shaft outer ring, a set of internal LED night lights and cover, slip ring internal bearings, slip ring bearing housing cover, a slip ring shaft outer ring cover, a position encoder bracket, a magnetic encoder pin, a magnetic encoder wheel, magnetic encoder pin mounting caps, a quadrature incremental encoder and wire connectors; said slip ring shaft having a larger outer end and a smaller inner end, wherein the larger outer end having a "+" shaped cavity and two small cavities; said slip ring shaft larger outer end having a "+" shaped cavity attached to a flat rectangular shaped pin which is coupled to a mounting bracket;

c. said slip ring shaft inner end having an opening, a center slot along the shaft, two locking grooves and a flat end on one side of the shaft; said slip-ring internal bearings comprising multiple wires routed through the two small cavities along the flat end side of the shaft, said wires are wrapped around the shaft through the center slot and soldered onto the bearings; the bearings wires are routed through the slip ring shaft outer ring cover and connected to the quadrature incremental encoder printed circuit board, wherein the wire connectors are soldered;

d. a removable color shade fabric having at least 4 mounting pads as respect to the number of mounting pads on the surface of said tubular tubes;

e. said removable color shade fabric having an optional bottom bar; said bottom bar having multiple sections joined together creating a single bar, wherein the open ends of each section are fitted with at least one knurl insert or female coupling.

2. The programmable and removable automatic motorized roller shade according to claim 1 wherein said tubular tubes are joined together with at least one set of male and female quick connect/disconnect couplings creating a single tubular tube with two open ends; when separating joined tubular tubes, one end of the female quick connect/disconnect coupling having two unequal sized female notches, locking notches and a hex diameter, wherein an 8-pin DIN female connector is coupled; other end of the male quick connect/disconnect coupling having two unequal sized male tab inserts and a hex diameter, wherein an 8-pin DIN male connector is coupled; said unequal sized male tab inserts protruding slightly within the front end inner diameter of the male coupling.

3. The programmable and removable automatic motorized roller shade according to claim 1 wherein said motor assembly further comprising a battery on-off switch, battery charging status LED and remote control programming switch; said slip ring assembly further comprising a micro controller programming switch and an internal photoresistor sensor; said larger outer end of the slip ring shaft further comprising an external photoresistor sensor connected to one of the two small cavities.

4. A method for operating and programming a programmable and removable automatic motorized roller shade with color LED night lights includes a removable color shade fabric, removable tubular tubes, manual programming new initial pre-programmed open shade home position using micro controller programming switch, auto home position correcting, automatic programming new user desirable close shade position, automatic open and close shade, manual remote controls programming using remote control programming switch and wireless remote controls programming using registered remote controls buttons comprising:

a. interfacing a quadrature incremental encoder using micro controller interrupts to count the number of ticks generated by a quadrature incremental encoder square wave output signals; the incremental ticks count increase by 1 when closing the shade in clockwise direction and the decremental ticks count decrease by 1 when opening the shade in counter-clockwise direction;

b. using the lowest minimum number of tick(s) count; the lower minimum number of ticks count, the chosen limited maximum number of ticks count; and the number of ticks count between the lowest minimum number of tick(s) count and the chosen limited maximum number of ticks count as reference points;

c. the movement of shade position manually by hands or remotely from the photoresistor, remote control, blue tooth or wifi is directly associated with reference points, variable descending speed, lower end speed and 10 seconds electronic brake;

d. the movement of shade position in triggering the operating and programming modes is associated with the number of ticks count value between the lowest/ lower minimum tick(s) count value and the chosen limited maximum ticks count value, the downward movement, upward movement and timers;

e. using a micro controller EEPROM memory to store the number of ticks count between the lowest/lower minimum number of tick(s) count and the chosen limited maximum number of ticks count;

f. using a micro controller EEPROM memory and timers to automatically program new user desirable close shade position, activating and de-activating programming mode, operating mode, engaging and disengaging electronic brake.

5. The method according to claim 4, further comprising:

a. pulling down the shade past the initial pre-programmed close shade position activating operating mode, resetting mode, programming mode, color LED night lights and 10 seconds timer;

b. pulling down the shade past the new user programmed desirable close shade position activating operating mode, resetting mode, programming mode, color LED night lights and 10 seconds timer;

c. manually programming said initial pre-programmed open shade home position to a new initial open shade home position using the micro controller programming switch;

d. resetting to default settings wirelessly using remote control, bluetooth and wifi control buttons;

e. automatically open and close the shade by detecting light level using internal or external photoresistor sensor with timers;

f. automatically turning on and off color LED night lights by detecting light level using internal or external photoresistor sensor;

g. manually turning on and off color LED night lights wirelessly using remote control, bluetooth and wifi control buttons.

6. The method according to claim 5, pulling down the shade after entering programming mode, new user desirable close shade position is automatically programmed to EEPROM memory.

7. The method according to claim 5 further includes:

a. pressing and holding said micro controller programming switch for 5 seconds and release causing said color LED night lights quickly flashing for 1 second, thus resetting said initial pre-programmed open shade home position;

b. moving the shade up or down manually by hands to any position and quickly pressing and releasing said micro controller programming switch for 1 second registering new user initial open shade home position;

c. color LED night lights momentarily flashing indicating programming mode and activating 10 seconds timer, moving the shade to any position registering as new user desirable close shade position to EEPROM memory;

d. otherwise, not moving the shade at all during the 10 seconds window, the initial pre-programmed close shade position registering to a default ticks count value 15;

e. pressing and holding open button in open shade home position resetting initial pre-programmed open shade home position, initial pre-programmed close shade position and new user desirable close shade position to default settings;

f. pressing and holding close button in close shade home position turning on and off color LED night lights.

8. The method according to claim 4, wherein:
a. the lowest minimum number of ticks count value is associated with original top reference point defined as original minimum open shade home position;
b. the chosen limited maximum number of ticks count value is associated with original bottom reference point defined as original limited maximum close shade position which can be changed to accommodate longer shade length;
c. the number of tick(s) count between the lowest/lower minimum and the chosen limited maximum number of ticks count stored in EEPROM memory is associated with initial pre-programmed close shade position and new user desirable close shade position;
d. the movement of shade position from any position to initial pre-programmed open shade home position, new user initial open shade home position, initial pre-programmed close shade position and new user desirable close shade position is associated with reference points, variable descending speed, lower end speed and 10 seconds electronic brake;
e. the movement of shade position from any position to initial pre-programmed open shade home position or new user initial open shade home position is associated with reference points, variable descending speed, lower end speed and 10 seconds electronic brake.

* * * * *